(12) United States Patent
Sarkar et al.

(10) Patent No.: US 10,796,429 B2
(45) Date of Patent: Oct. 6, 2020

(54) SYSTEMS AND METHODS FOR AREA-OF-INTEREST DETECTION USING SLIDE THUMBNAIL IMAGES

(71) Applicant: Ventana Medical Systems, Inc., Tucson, AZ (US)

(72) Inventors: Anindya Sarkar, Milpitas, CA (US); Jim Martin, Mountain View, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 296 days.

(21) Appl. No.: 15/659,656

(22) Filed: Jul. 26, 2017

(65) Prior Publication Data

US 2018/0012355 A1 Jan. 11, 2018

Related U.S. Application Data

(63) Continuation of application No. PCT/EP2016/051967, filed on Jan. 29, 2016.
(Continued)

(51) Int. Cl.
*G06K 9/00* (2006.01)
*G06T 7/00* (2017.01)
(Continued)

(52) U.S. Cl.
CPC ........ *G06T 7/0012* (2013.01); *G06K 9/00127* (2013.01); *G06T 7/11* (2017.01);
(Continued)

(58) Field of Classification Search
None
See application file for complete search history.

(56) References Cited

U.S. PATENT DOCUMENTS

| 6,868,183 B1* | 3/2005 | Kodaira | G06K 9/00456 382/176 |
| 2003/0095147 A1* | 5/2003 | Daw | G01R 33/56 715/771 |

(Continued)

FOREIGN PATENT DOCUMENTS

WO 2014181347 A2 11/2014

OTHER PUBLICATIONS

International Preliminary Report on Patentability dated Aug. 10, 2017 in corresponding PCT/E P2016/051967 filed on Jan. 29, 2016, pp. 1-14.
(Continued)

*Primary Examiner* — Atiba O Fitzpatrick
(74) *Attorney, Agent, or Firm* — Charney IP Law LLC; Thomas M. Finetti

(57) ABSTRACT

The subject disclosure provides systems and methods for determination of Area of Interest (AOI) for different types of input slides. Slide thumbnails may be assigned into one of five different types, and separate algorithms for AOI detection executed depending on the slide type. Slide types include ThinPrep® slides, tissue micro-array (TMA) slides, control HER2 slides with 4 cores, smear slides, and a generic slide. The slide type may be assigned based on a user input. Customized AOI detection operations are provided for each slide type. If the user enters an incorrect slide type, operations include detecting the incorrect input and executing the appropriate method. The result of each AOI detection operations provides as its output a soft-weighted image having zero intensity values at pixels that are detected as not belonging to tissue, and higher intensity values assigned to pixels detected as likely belonging to tissue regions.

7 Claims, 17 Drawing Sheets

Related U.S. Application Data

(60) Provisional application No. 62/110,473, filed on Jan. 31, 2015.

(51) Int. Cl.
*G06T 7/11* (2017.01)
*G06F 3/0482* (2013.01)

(52) U.S. Cl.
CPC ........ *G06F 3/0482* (2013.01); *G06T 2200/24* (2013.01); *G06T 2207/10056* (2013.01); *G06T 2207/20092* (2013.01); *G06T 2207/20132* (2013.01); *G06T 2207/30024* (2013.01); *G06T 2207/30072* (2013.01)

(56) References Cited

U.S. PATENT DOCUMENTS

| | | | |
|---|---|---|---|
| 2006/0127880 A1 | 6/2006 | Harris | |
| 2009/0046908 A1* | 2/2009 | Safdar | A61B 5/103 382/128 |
| 2014/0314300 A1* | 10/2014 | Kaufman | G06K 9/00127 382/133 |
| 2015/0125073 A1* | 5/2015 | Hwang | G06F 16/5866 382/159 |

OTHER PUBLICATIONS

International Search Report and Written Opinion dated Jul. 11, 2016 in corresponding PCT/E P2016/051967 filed on Jan. 29, 2016, pp. 1-20.

* cited by examiner

SYSTEMS AND METHODS FOR AREA-OF-INTEREST DETECTION USING SLIDE THUMBNAIL IMAGES

CROSS-REFERENCE TO RELATED APPLICATIONS

This patent application is a continuation of International Patent Application No. PCT/EP2016/051967 filed Jan. 29, 2016, which claims priority to and the benefit of U.S. Provisional Application No. 62/110,473, filed Jan. 31, 2015. Each of the above patent applications are hereby incorporated by reference herein in their entireties.

BACKGROUND OF THE SUBJECT DISCLOSURE

Field of the Subject Disclosure

The present subject disclosure relates to digital pathology. More particularly, the present subject disclosure relates to tissue detection on glass slides containing tissue biopsies used to generate whole slide scans.

Background of the Subject Disclosure

In the field of digital pathology, biological specimens such as tissue sections, blood, cell cultures and the like may be stained with one or more stains and analyzed by viewing or imaging the stained specimen. Observing the stained specimen, in combination with additional clinical information, enables a variety of processes, including diagnosis of disease, prognostic and/or predictive assessment of response to treatment, and assists in development of new drugs to fight disease. As used herein, a target or target object is a feature of the specimen that a stain identifies. A target or target object may be a protein, protein fragment, nucleic acid, or other object of interest recognized by an antibody, a molecular probe, or a non-specific stain. Those targets that are specifically recognized may be referred to as biomarkers in this subject disclosure. Some stains do not specifically target a biomarker (e.g. the often used counterstain hematoxylin). While hematoxylin has a fixed relationship to its target, most biomarkers can be identified with a user's choice of a stain. That is, a particular biomarker may be visualized using a variety of stains depending on the particular needs of the assay. Subsequent to staining, the assay may be imaged for further analysis of the contents of the tissue specimen. Imaging includes scanning of glass slides that contain stained tissue samples or biopsies. The staining is important as the stain acquired by cells/microscopic structures is an indication of the pathological condition of the tissue and can be used for medical diagnosis. In a manual mode, the glass slides are read by trained pathologists under the microscope. In the digital mode, the whole slide scan is read either on a computer monitor, or it is analyzed by imaging algorithms to automatically score/analyze the stained tissue content in the whole slide scan. Thus, good quality scanning is absolutely essential for digital pathology to be effectively used.

For good quality scanning, it is very important to detect tissue properly on glass. The tissue region on the glass slide is referred to as Area of Interest (AOI). The AOI detection can be manually done from the thumbnail image, which is a low resolution capture of the glass slide. However, for fast, batch mode scanning, the AOI needs to be automatically extracted from the slide thumbnail image. Unfortunately, the first step in existing methods of acquiring a thumbnail image prior to any further analysis is limited to using low resolution thumbnail cameras, and accurate and precise AOI detection is highly challenging, particularly given the variability of data with different types of slides having different stain intensities, morphology, tissue organization, etc. The use of a single AOI detection methodology for a wide variety of slides has made solving of the AOI problem very difficult.

SUMMARY OF THE SUBJECT DISCLOSURE

The subject disclosure solves the above-identified problems by providing systems and computer-implemented methods for accurate determination of AOIs for various different types of input slides. Slide thumbnail images (or thumbnails) may be assigned into one of five different types, and separate algorithms for AOI detection may be executed depending on the slide type, with the goal being to execute operations that can efficiently and accurately compute AOI regions from whole slide thumbnail images, since a single generic solution is unable to account for all the data variability. Each thumbnail may be divided into one of 5 types based on the tissue morphology, layout, organization of tissue on the slide thumbnail, etc. The slide types include ThinPrep® slides, also referred to as "cell line slides", having a single disc structure (or any other similarly stained slide), tissue micro-array (TMA) slides having a grid structure, control slides having faint tissue (for a controlHER2 tissue slide, there exists a specified number of circular cores, usually 4), smear slides having tissue diffused throughout the slide, and a default or generic slide. A control slide is a slide type comprising both a tissue sample (that shall actually be examined and analyzed) and a control tissue sample that is typically used for verifying histological techniques and reagent reactivity. It comprises a plurality of tissue regions (cores) of the tissue sample to be actually analyzed at defined positions along a straight line.

Any slide which cannot be visually categorized to any of the first 4 categories may be considered a generic slide. The slide type may be assigned based on a user input. Customized AOI detection operations are provided for each slide type. Moreover, if the user enters an incorrect slide type, then the disclosed operations include detecting the incorrect input and executing the appropriate method. The result of each AOI detection operations provides as its output a soft-weighted image having zero intensity values at pixels that are detected as not belonging to tissue, and higher intensity values assigned to pixels detected as likely belonging to tissue regions. The detected tissue region is referred to as an Area of Interest (AOI). Optimized AOI detection is an important step in the overall scanning process and enables subsequent steps such as focus point allocation based on the soft weights assigned to the likely tissue regions in the output image. Higher weighted AOI regions are more likely to be assigned focus points. The described operations are superior to previous methods in terms of precision and recall score, and have been verified using scored computed with ground truth AOI data.

In one exemplary embodiment, the subject disclosure provides a system for detecting an area-of-interest (AOI) on a thumbnail image of a tissue slide including a processor and a memory coupled to the processor for storing computer-executable instructions that are executed by the processor to perform operations including receiving an input comprising a thumbnail image and a thumbnail image type, and determining an area of interest (AOI) from the thumbnail image using one of a plurality of AOI detection methods depending on the thumbnail image type, wherein upon a determination that the thumbnail image type is incorrectly input, the determination of the AOI uses another of the plurality of AOI detection methods.

In another exemplary embodiment, the subject disclosure provides a system for detecting an area-of-interest (AOI) on a thumbnail image of a tissue slide including a processor and a memory coupled to the processor for storing computer-executable instructions that are executed by the processor to perform operations including determining an area of interest (AOI) from a thumbnail image using one of a plurality of AOI detection methods depending on the thumbnail image type, and outputting a soft-weighted image depicting the detected AOI, wherein the thumbnail image type represents one of a ThinPrep® slide, a tissue microarray slide, a control slide, a smear slide, or a generic slide.

In yet another exemplary embodiment, the subject disclosure provides a system for detecting an area-of-interest (AOI) on a thumbnail image of a tissue slide including a processor and a memory coupled to the processor for storing computer-executable instructions that are executed by the processor to perform operations including receiving an input comprising a thumbnail image and a thumbnail image type, determining an area of interest (AOI) from the thumbnail image using one of a plurality of AOI detection methods depending on the thumbnail image type, the plurality of AOI detection methods including a ThinPrep® method, a tissue microarray method, a control method, a smear method, or a generic method, and upon determining that the thumbnail image type is incorrectly input, using the generic method.

The expressions AOI detection and tissue region detection will in the following be used synonymously.

In a further aspect, the invention relates to an image analysis system configured for detecting a tissue region in a digital image of a tissue slide. A tissue sample is mounted on the slide. The image analysis system comprises a processor and a storage medium. The storage medium comprises a plurality of slide-type specific tissue detection routines and a generic tissue detection routine. The image analysis system is configured for performing a method comprising:
- selecting one of the slide-type specific tissue detection routines;
- checking, before and/or while the selected slide-type specific tissue detection routine is performed, if the selected slide-type specific tissue detection routine corresponds to the tissue slide type of the slide depicted in the digital image;
- if yes, automatically performing the selected slide-type specific tissue detection routine for detecting the tissue region in the digital image
- if no, automatically performing the generic tissue detection routine for detecting the tissue region in the digital image. The generic tissue detection routine is also referred herein as "default" tissue detection routine, module or algorithm.

DETAILED DESCRIPTION OF THE SUBJECT DISCLOSURE

Figure 1:
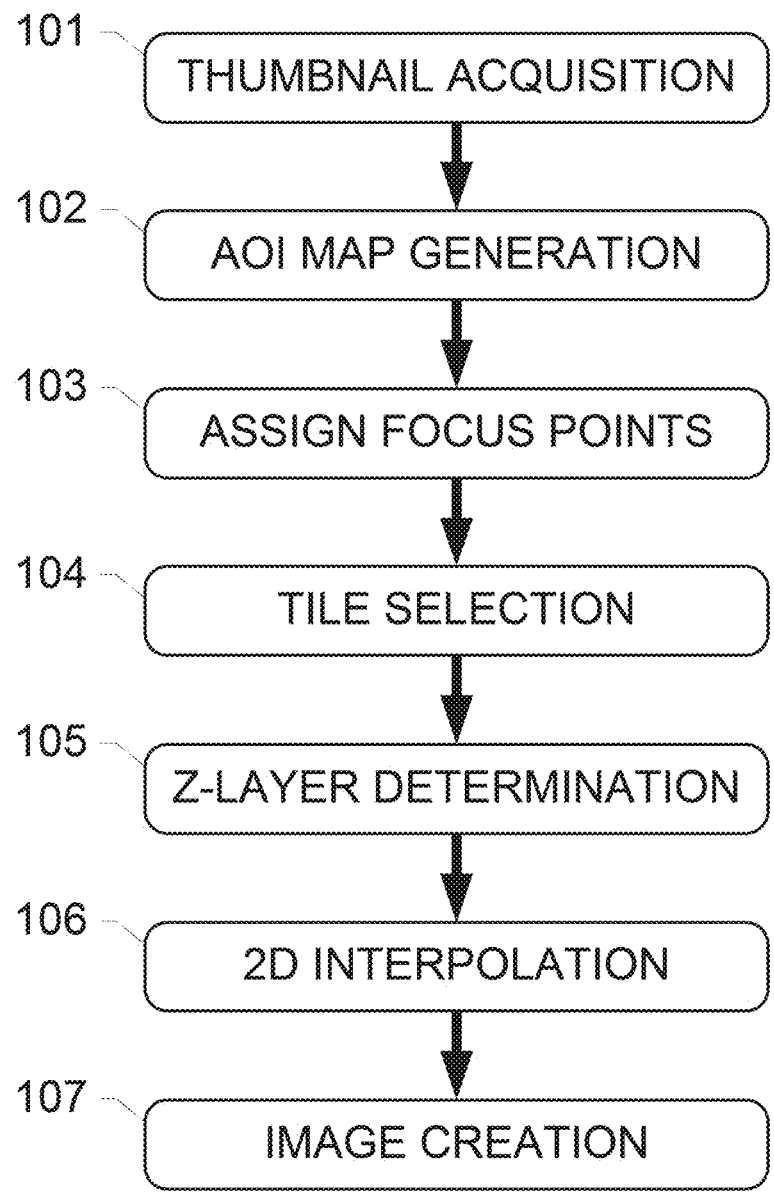
FIG. 1 depicts an overview of a slide scanning process, according to an exemplary embodiment of the subject disclosure.

The subject disclosure provides systems, computer-implemented methods for accurate determination of AOIs for various different types of input slides. The AOI detection modules described herein are vital for optimized tissue detection on a glass slide, and are therefore an intrinsic part of an automated scanning system. Once a digital scan is obtained from a whole slide, a user may read the scanned image to come up with a medical diagnosis (digital read), or an image analysis algorithm can be used to automatically analyze and score the image (image analysis read). Thus, the AOI module is an enabling module, where it enables accurate and time-efficient scanning of glass slides, and thus it enables all subsequent digital pathology applications. As scanning is performed at the beginning of a digital pathology workflow, after acquiring a stained tissue biopsy slide, and scanning is enabled by the disclosed AOI detection. For each of the slide types, including generic, a locally adaptive determination of the threshold(s) may be determined for the tissue, and the results merged into a "tissue probability" image. That is, the probability of a pixel being tissue is determined based on both global and local constraints.

In general, once a user selects a slide type, the disclosed methods include automatically performing an internal validation to check if the user has entered a wrong slide type (corresponding to a wrongly selected tissue-slide-type specific tissue detection algorithm), and run the proper tissue detection algorithm. For a slide marked as Control by the user, the operations disclosed herein may determine whether the slide is an example of ControlHER2 with 4 cores lying along a straight line, and if not, a generic tissue finder module for AOI extraction may be invoked. For a slide marked as TMA by the user, the methods may determine whether the slide is an example of a single rectangular grid of cores (based on training TMA slides) and if not, the disclosed methods invoke the generic tissue finder mode for AOI extraction. For ThinPrep® images, a single core (AOI) may be captured under the assumption that the radius of the single core is known, within a range of variation, which has been empirically determined; and radial symmetry based voting, performed on the gradient magnitude of a down-sampled version of the enhanced grayscale image, is used to determine the center of the core and its radius. Other slides stained similarly to ThinPrep® slides may be processed using this method. For a description of radial symmetry voting to generally detect blobs or circular objects, see Parvin, Bahram, et al. "Iterative voting for inference of structural saliency and characterization of subcellular events." Image Processing, IEEE Transactions on 16.3 (2007): 615-623, the disclosure of which is incorporated by reference in its entirety herein. For faint Control images, the operations automatically determine whether it is of type "generic" (faint slide) or Control HER2 (has 4 faint cores), and can detect the 4 cores assuming their approximate size range is known and that their centers lie approximately in a line. The Control HER2 method uses radial symmetry followed by Difference of Gaussian (DoG) based filtering so as to capture the likely locations of the core centers; then empirically determined rules are used based on how aligned the core center locations are, based on the distance between the core centers, and based on the angle formed by the most likely line fitted to the core centers. For TMA images, in the condition where the slide cores are located in a rectangular grid, the method detects all the relevant tissue area, assuming that for the TMA cores, the individual core size and distance from a core to its nearest core are all very similar. For detecting cores, size and shape related constraints are used and once the cores are detected, empirically determined rules are used to determine between genuine and outlier cores based on distance constraints. For smear slides, the tissue region can be reliably identified all through the slide assuming that the smear tissue can be spread all over the glass slide; here lower and upper thresholds have been computed based on luminance and color images, derived from LUV color space representation of the thumbnail image, where the inverse of L is used as luminance image and square root of U-squared and V-squared is used as the color image; hysteresis thresholding is conducted based on these thresholds and an empirically determined area constraint. For the default/generic image, the tissue region is properly detected using a range of thresholds darker than glass, and using size and distance constraints to detect and discard certain smaller regions. Moreover, once a certain AOI detection module is invoked, and the user can see the generated AOI on the thumbnail image, the user may add extra focus points, in the rare event that some tissue has been missed by the algorithm. In the rare scenario where the computed AOI do not sufficiently capture all the tissue area, additional focus points can be placed using the GUI as deemed necessary by the user, especially where the algorithm has failed to do so on the tissue areas.

The thumbnail image may be provided directly by an image scanner or may be computed from an original image by the image analysis system. For example, an image scanner may comprise a low-resolution camera for acquiring thumbnail images and a high-resolution camera for acquiring a high resolution image of a tissue slide. A thumbnail image may roughly comprise 1000×3000 pixels, whereby one pixel in a thumbnail image may correspond to 25.4 µm of the tissue slide. An "image analysis system" can be, for example, a digital data processing device, e.g. a computer, comprising an interface for receiving image data from a slide scanner, a camera, a network and/or a storage medium.

The embodiments described herein are merely exemplary and, although they disclose best modes enabling persons having ordinary skill in the art to replicate the results depicted herein, readers of this patent application may be able to execute variations of the operations disclosed herein, and the claims should be construed to encompass all variants and equivalents of the disclosed operations, and are not limited solely to the disclosed embodiments.

FIG. 1 depicts an overview of a slide scanning process, according to an exemplary embodiment of the subject disclosure. Generally, one or more stained tissue biopsy slides may be placed in a scanning system for imaging operations. The system may include a means 101 for capturing a thumbnail image of the glass slide. This means may include a camera designed for the purpose. The image may be any type, including an RGB image. Processing operations 102 may be performed on the thumbnail image to generate a map comprising soft-weights that depict areas of interest (AOIs) for further analysis. Embodiments described herein are targeted towards systems and computer-implemented methods for optimally processing thumbnail images and accurately providing AOI maps indicating a probability of specific or target tissue structures. The AOI maps may be used to assign focus points 103 based on the probabilities, and for each focus point, tiles are considered 104 around the focus points along with a collection of z-layers for the tile location, followed by the determination of the best z-layer 105, 2-dimensional interpolation 106 between z-layers, and creation of an image 107 using the interpolated layers. The resulting image creation 107 enables further analysis steps such as diagnosis, prognosis, etc. This process may comprise additional or fewer steps depending on the imaging system being used, and is intended to be construed merely to provide a context, with no limitations intended to be imposed on any of the features described herein.

Figure 2A:
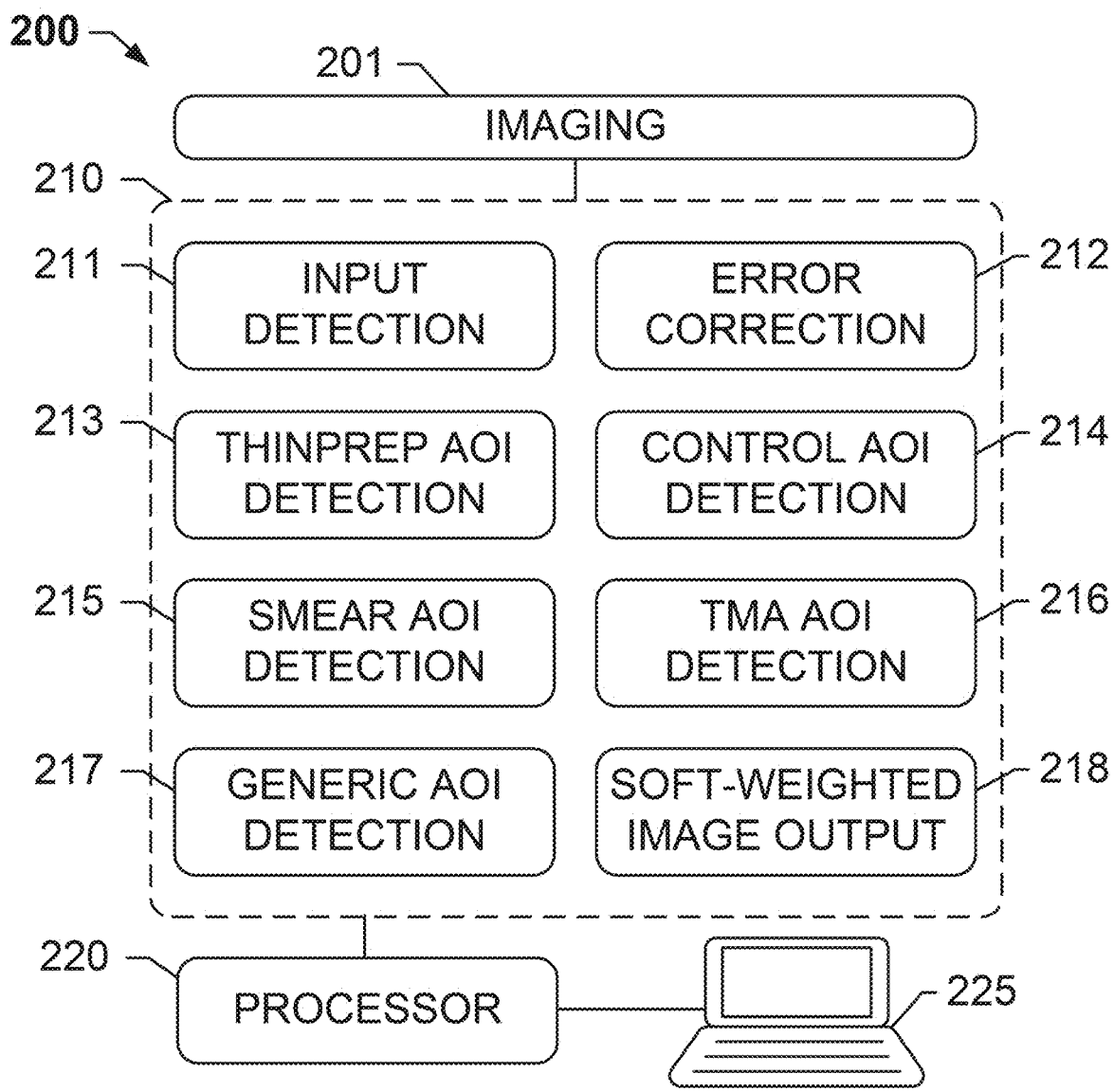
FIGS. 2A-2C respectively depict a system and user interfaces for AOI detection, according to an exemplary embodiment of the subject disclosure.

FIG. 2A depicts a system 200 for AOI detection, according to an exemplary embodiment of the subject disclosure. System 200 may comprise hardware and software for detection of AOIs from one or more thumbnail images. For example, system 200 may comprise imaging components 201, such as a camera mounted on a slide stage or slide tray, and/or a whole-slide scanner having a microscope and a camera. Imaging components 201 generally depend on the type of image being generated. In the present embodiment, imaging components 201 include at least a camera for generating a thumbnail image of a slide. The slide may include a sample that has been stained by means of application of a staining assay containing one or more different biomarkers associated with chromogenic stains for brightfield imaging. The tissue region is stained and AOI detection involves picking up the stained tissue region. The stained areas of interest may depict desired tissue types such as tumors, lymphatic regions in an H&E slide, etc., or hot spots of high biomarker expression in IHC stained slides like any tumor, immune or vessel markers tumor markers, immune markers, etc. The images may be scanned at any zoom level, coded in any format, and may be provided by imaging components 201 to memory 210 to be processed according to logical modules stored thereon. Memory 210 stores a plurality of processing modules or logical instructions that are executed by processor 220 coupled to computer 225. Besides processor 220 and memory 210, computer 225 may also include user input and output devices such as a keyboard, mouse, stylus, a display/touchscreen, and networking elements. For example, execution of processing modules within memory 210 may be triggered by user inputs, as well as by inputs provided over a network from a network server or database for storage and later retrieval by computer 225. System 200 may comprise a whole slide image viewer to facilitate viewing of the whole slide scans.

As described above, the modules include logic that is executed by processor 220. "Logic", as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from signals stored on a computer-readable medium such as memory 210 that, in exemplary embodiments, may be a random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network. Moreover, the modules need not be executed in any specific order. Each module may call another module when needed to be executed.

Figure 2B:
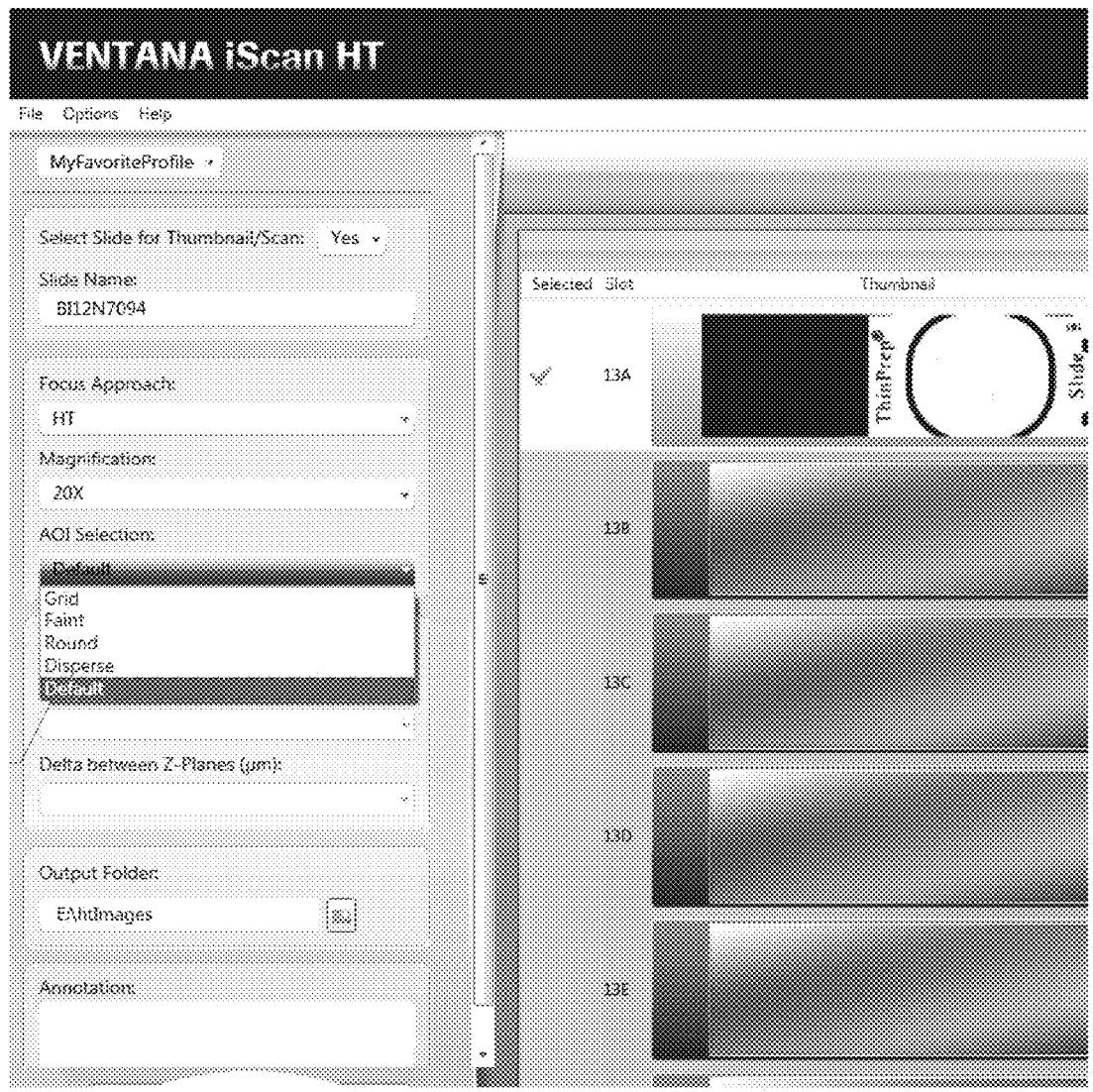

An input detection module may receive a thumbnail image from imaging components 201, as well as a user input identifying a slide type. The thumbnail image (or "thumbnail") may be assigned into a category based on the slide type input by the user, and separate algorithms 213-217 for AOI detection may be executed depending on the category. Each thumbnail may be divided into one or more types based on the tissue morphology, layout, organization of tissue on the thumbnail. The slide types include but are not limited to ThinPrep® slides having a single disc structure, tissue micro-array (TMA) slides having a grid structure, control slides having faint tissue with a specified number of circular cores (usually 4), smear slides having tissue diffused throughout the slide, and a default or generic slide that includes all slides that do not fit in either of the previous categories. As an example, FIG. 2B depicts a user interface for receiving a slide type based on a user input. The user may enter a correct slide type on viewing the slide thumbnail based on a selection list 219. For example, the user may choose among the following slide types: Grid (referring to TMA slides where the tissue cores are present in a single rectangular grid), Faint (control slides are generally faint and due to the control stains, they are never positively stained and that makes the thumbnail image appear faint), Round (in ThinPrep® slides, there is a single circular core of a certain radius range present in the slide thumbnail), Disperse (for smears, the tissue is generally spread all throughout the slide and is not confined to a certain area like the other slide types), and Default, also referred to as generic.

Each of modules 213-217 for AOI detection are customized for each of these slide types. For instance, for ThinPrep® slides, the tissue AOI is typically a single disc, and hence a circle-finder in a given radius range is an effective tool. Other slides similar to ThinPrep® slides, such as wherein the tissue sample is in a circular or near-circular shape, may be processed using a specific module. Similarly, control HER2 slides typically have 4 cores with a known approximate radius range and variations in intensity from darker to fainter from bottom to top. In a smear slide, the tissue spreads and occupies a larger part of the whole thumbnail image, and the AOI is not concentrated in smaller, more compact shapes, as is the case for the other types. In a TMA or grid slide, the AOI is generally seen in a m×n grid, where the grid elements can vary in size (individual TMA blobs can be much smaller in size as compared to blobs seen in other non-TMA thumbnail images), therefore the knowledge of a grid helps put constraints on the expected size of the constituent blobs thus helping to weed out outlier blobs and shapes. Generic AOI detection module 217 provides a catch-all operation for any slide that does not explicitly/visually belong to these 4 slide types. The detected tissue region for each detection module is referred to as an Area of Interest (AOI).

The result of each AOI detection operation (that may be performed by the generic or one of the tissue-slide-type specific tissue detection routines) is provided to a soft-weighted image output module 218 to generate an output of a soft-weighted image having zero intensity values at pixels that are detected as not belonging to tissue, and higher intensity values assigned to pixels detected as likely belonging to tissue regions. In a "soft-weighted image", each pixel has assigned a weight, referred herein also as "soft weight". A "soft weight" as used herein is a weight whose value lies in a value range that comprises more than two different values (i.e., not only "zero" and "one"). For example, the value range may cover all integers from 0 to 255 or may be a floating point number between 0 and 1. The weight indicates a likelihood of the pixel lying in a tissue region rather than in a non-tissue region, e.g. a glass region. The greater the value of the weight, the higher is the likelihood that the pixel lies in a tissue region.

Soft-weighted image output module 218 is invoked to compute a soft weighted image for a given luminance and color image and a binary mask that corresponds to the AOI (i.e. the unmasked regions of the mask representing tissue regions). Generally, colored pixels are more likely to be tissue than glass; hence, pixels where the chrominance (color) component is higher are weighted higher. Darker pixels (based on luminance) are more likely to be tissue than fainter pixels. This module uses an RGB image, e.g. the RGB thumbnail image, and a binary mask M as its inputs, with the binary mask M provided by either of AOI detection modules 213-217 (i.e., provided by the generic or one of the tissue-slide-type specific tissue detection routines), and provide an output of a soft weighted image SW with pixel values e.g. in [0, 255].

The image is first converted from an RGB color space to an L, UV color space (L=luminance, U and V are color channels). Let L'=max(L)−L, wherein max(L) is the maximum luminance value observed in the converted digital image and L is a luminance value of a currently transformed pixel; (higher L'→darker regions).

The UV color space, also referred to as chrominance color space or composite UV color channel is computed according to UV=sqrt(U^2+V^2).

For the luminance image, the image analysis method identifies all pixels where M>0 (e.g. the regions of the image not masked by the generated mask M), and compute lower ($L'_{low}$: 5% value of sorted L' values) and higher thresholds ($L'_{high}$: 95% value) in L' domain for the identified pixels.

Similarly, compute lower ($UV_{low}$: 5% value of sorted UV values) and higher ($UV_{high}$: 95% value) thresholds in UV domain. Instead of said 5%, values in the range of 2-7% may also be used. Instead of said 95%, values in the range of 90-98% may also be used.

Compute WeightedL image from L' domain, using $L'_{low}$ and $L'_{high}$. The mapping from L' to WeightedL upon creating the WeightedL image includes setting L'(x,y)≤$L'_{low}$→WeightedL(x,y)=0, and setting $L'_{low}$<L'(x,y)<$L'_{high}$→WeightedL(x,y)=(L'(x,y)−$L'_{low}$)/($L'_{high}$−$L'_{low}$), and setting L'(x,y)>$L'_{high}$→WeightedL(x,y)=1. This means that a pixel of the weightedL image has a value of "0" if its original L' value is below the $L'_{low}$ threshold, has a value of "1" if its original L' value is above the $L'_{high}$ threshold, and has a value of (L'(x,y)−$L'_{low}$)/($L'_{high}$−$L'_{low}$) in all other cases. The value (L'(x,y)−$L'_{low}$)/($L'_{high}$−$L'_{low}$) is a normalized inverse luminance value, the normalization being performed over the unmasked pixels.

Similarly, WeightedUV is computed from the UV image:

The image analysis system computes a WeightedUV image from UV' domain, using $UV'_{low}$ and $UV'_{high}$. The mapping from UV' to WeightedUV upon creating the WeightedUV image includes setting $UV'(x,y) \leq UV'_{low} \rightarrow$ WeightedUV$(x,y)=0$, and setting $UV'_{low} < UV'(x,y) < UV'_{high} \rightarrow$ Weighted UV $(x,y)=(UV'(x,y)-UV'_{low})/(UV'_{high}-UV'_{low})$, and setting $UV'(x,y) > UV'_{high} \rightarrow$ Weighted UV $(x,y)=1$. This means that a pixel of the weightedUV image has a value of "0" if its original UV' value is below the $UV'_{low}$ threshold, has a value of "1" if its original UV' value is above the $UV'_{high}$ threshold, and has a value of $(UV'(x,y)-UV'_{low})/(UV'_{high}-UV'_{low})$ in all other cases. The value $(UV'(x,y)-UV'_{low})/(UV'_{high}-UV'_{low})$ is a normalized inverse chrominance value, the normalization being performed over the unmasked pixels.

Then, a combined weighted image W may be created by merging the WeightedL and the WeightedUV image. For example, the weight assigned to each pixel in the weighted image W could be computed as the average of the weights of said pixel in the WeightedL and the WeightedUV image.

Then, the image analysis system maps the weighted image W to a soft weighted image whose pixels respectively having assigned a weight, also referred to as "soft weight" between 0 and 1.

Mapping from (weighted image W, mask image M) to SW includes computing a scale factor s according to $s=(255-128)/(W_{max}-W_{min})$, wherein $W_{max}$ is the maximum observed weight in the weight image W and $W_{min}$ is the minimum observed weight in the weight image W, whereby the max and min values in W are selectively computed for pixels of the digital image where M>0, and setting $M(x,y)=0 \rightarrow SW(x,y)=0$, therefore $M(x,y)>0 \rightarrow$ value=$(W(x,y)-Wmin)*s+128$; $SW(x,y)=min(max(128,value), 255)$. Thereby, 255 represents the maximum possible intensity value of an RGB image and 128 half of said value. The pixels of the soft-weighted image SW have zero intensity at the (non-tissue) regions masked by the mask M and have a "normalized" intensity value in the range of 128-255, whereby the intensity value is derived from the weight of the pixel and indicates the likelihood of the pixel of being a tissue-region pixel.

Optimized AOI detection is an important step in the overall scanning process and enables subsequent steps such as focus point allocation based on the soft weights assigned to the likely tissue regions in the output image. Higher weighted AOI regions are more likely to contain focus points.

A "focus point" as used herein is a point in a digital image that is automatically identified and/or selected by a user because it is predicted or assumed to be indicative of relevant biomedical information. The automated or manual selection of a focus point may trigger, in some embodiments, a scanner to automatically retrieve further, high-resolution image data from regions surrounding said focus point.

Figure 2C:
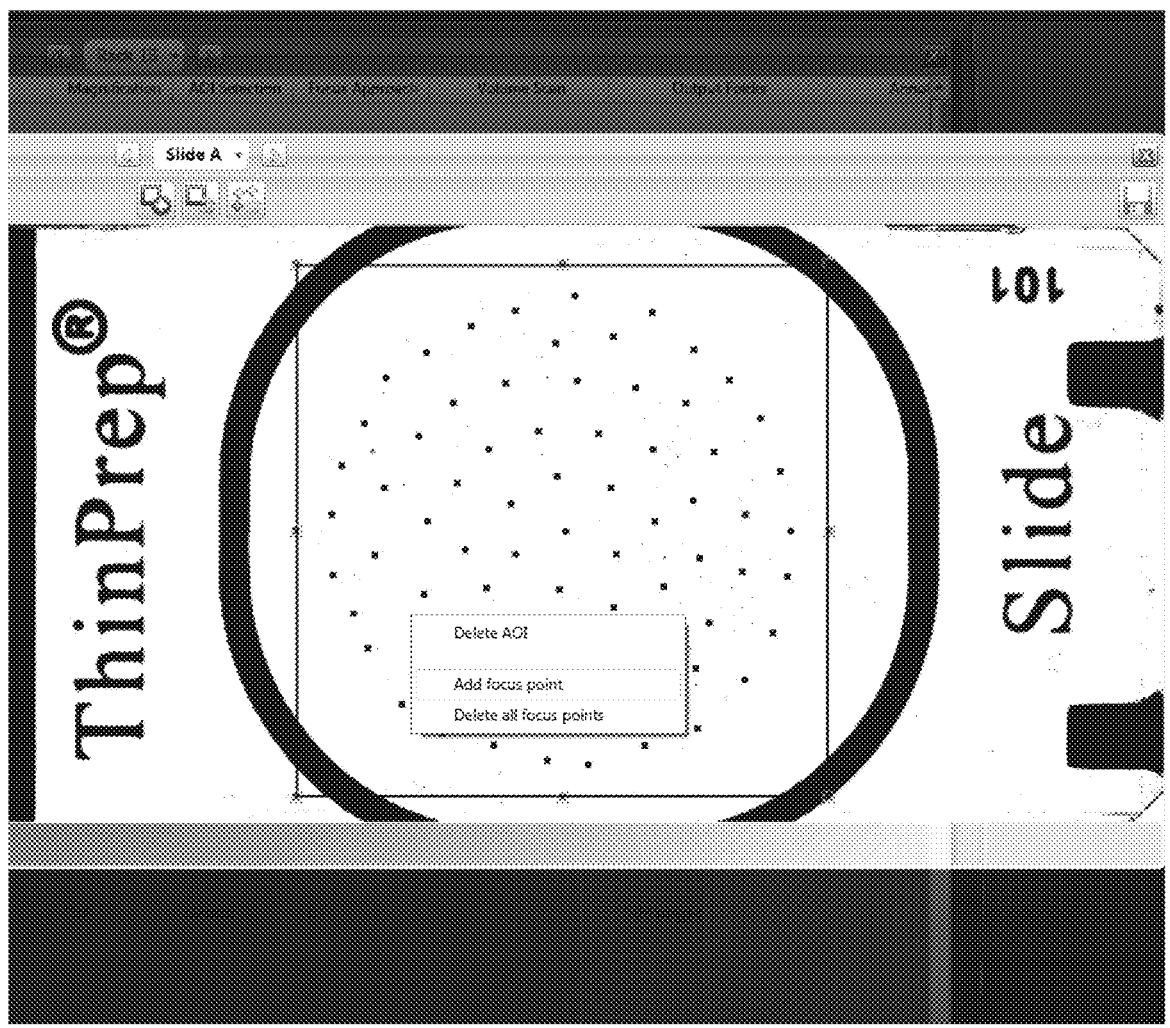

However, for cases where the obtained AOI is not precise and the scanning technician or other operator of system 200 wishes to add more focus points to obtain a better scan, such an option may be enabled via the user interface. For example, FIG. 2C depicts an exemplary interface for manually adding additional focus points. The interface of FIG. 2C may be presented on a computer that is coupled to, for instance, a scanner for scanning tissue slides. Moreover, the described operations are superior to previous methods in terms of precision and recall score, and have been verified using scored computed with ground truth AOI data. For example, AOI detection modules 213-217 were developed based on a training set of 510 thumbnail images. The AOI detection modules have used some empirically set parameters for features such as minimum connected component size, distance of a valid tissue region from cover slip edges, possible cover slip locations, color thresholds to distinguish between valid tissue regions and dark pen colors, with the parameters being set based on the observed thumbnails as further described herein.

Memory 210 also stores an error correction module 212. Error correction module 212 may be executed upon attempting to find AOIs in the input slide type and encountering an unexpected result. Error correction module 212 includes logic to determine that the wrong slide type has been input, and to select an appropriate AOI detection module regardless of the input. For example, the TMA AOI detection module 216 may expect to see a single rectangular grid; however it may happen that there are multiple grids in the same thumbnail. In such a case, the TMA AOI detection may capture only a single grid pattern and miss the rest. In this case, generic AOI detection module 217 may be more useful to determine all appropriate AOIs in the slide. If a user inputs a slide type as a "faint" slide, generic AOI detection module 217 may be executed. For example, the user may indicate via a graphical user interface (GUI), e.g. by pressing a button or selecting a menu item that the currently analyzed image is a "faint" image. A "faint" image as used herein is an image that comprises tissue regions that are not very dark compared to the brightness of the glass, i.e., having a low contrast between tissue and glass regions. In an inverted grayscale image, the brightest parts are the most dense tissue and the darkest parts are the least dense tissue and the completely dark (masked) parts correspond to glass. However, the term "faint" may also apply for control images, i.e. those having 4 cores. Hence, when "faint" image type is received as input, control AOI detection module 214 may be executed, and if 4 cores are not detection, then error correction module 212 instead calls generic AOI detection module 217. Similarly, for some TMA images, the TMA AOI detection module 216 may retrieve only a small fraction of the prospective AOI data, thereby triggering a determination that there may be multiple grids in the thumbnail, and therefore a determination that generic AOI detection may be better than the TMA AOI detection. These and other alternative selections for incorrectly-input slide types are described below with reference to Table 1.

TABLE 1

Operations of error correction module 212 (expected performance in parenthesis).

| User Input → Actual slide ↓ | Generic | TMA | Control (HER2) | ThinPrep | Smear |
|---|---|---|---|---|---|
| Generic | (OK) | Branch to generic (medium level performance as | (bad if it is a faint 4-core) | (bad) | (medium) |

TABLE 1-continued

Operations of error correction module 212 (expected performance in parenthesis).

| User Input → Actual slide ↓ | Generic | TMA | Control (HER2) | ThinPrep | Smear |
|---|---|---|---|---|---|
| TMA | Branch to generic if needed | small TMA cores may be missed by generic method) (OK, can branch to generic if needed) | (Bad for 4 cores) Even if algorithm branches to generic | (Bad) Even if algorithm branches to generic | (Medium) If algorithm branches to generic |
| Control (HER2) | (OK) Branch to generic unless generic image has 4-5 cores | (Medium) Branch to generic unless TMA image has 4-5 cores in a vertical line | (OK for 4 cores) Will internally branch to generic if it is not a 4-core image | (Bad) Even if algorithm branches to generic | (Medium) If algorithm branches to generic |
| ThinPrep | (Bad) Always expects a circle which may not be the AOI shape in general | (Bad) | (Bad) | (OK) | Bad |
| Smear | (Medium) Expects a scattered AOI, compact blobs are not captured | (Bad) | (Bad) | (Bad) | (OK) |

Each row in Table 1 indicates the slide type input by a user, and each column indicates the actual-slide-type. Each cell indicates a performance level expected from the operations (bad, medium, OK, etc.). For the smear and ThinPrep® images, default modes are not provided, i.e. there is no branching to the generic mode for either of these cases. It should be noted that it is generally preferable to capture more spurious tissue regions than to miss out on a potential tissue region, since missed detections are penalized more severely than false detections.

Figure 3A:
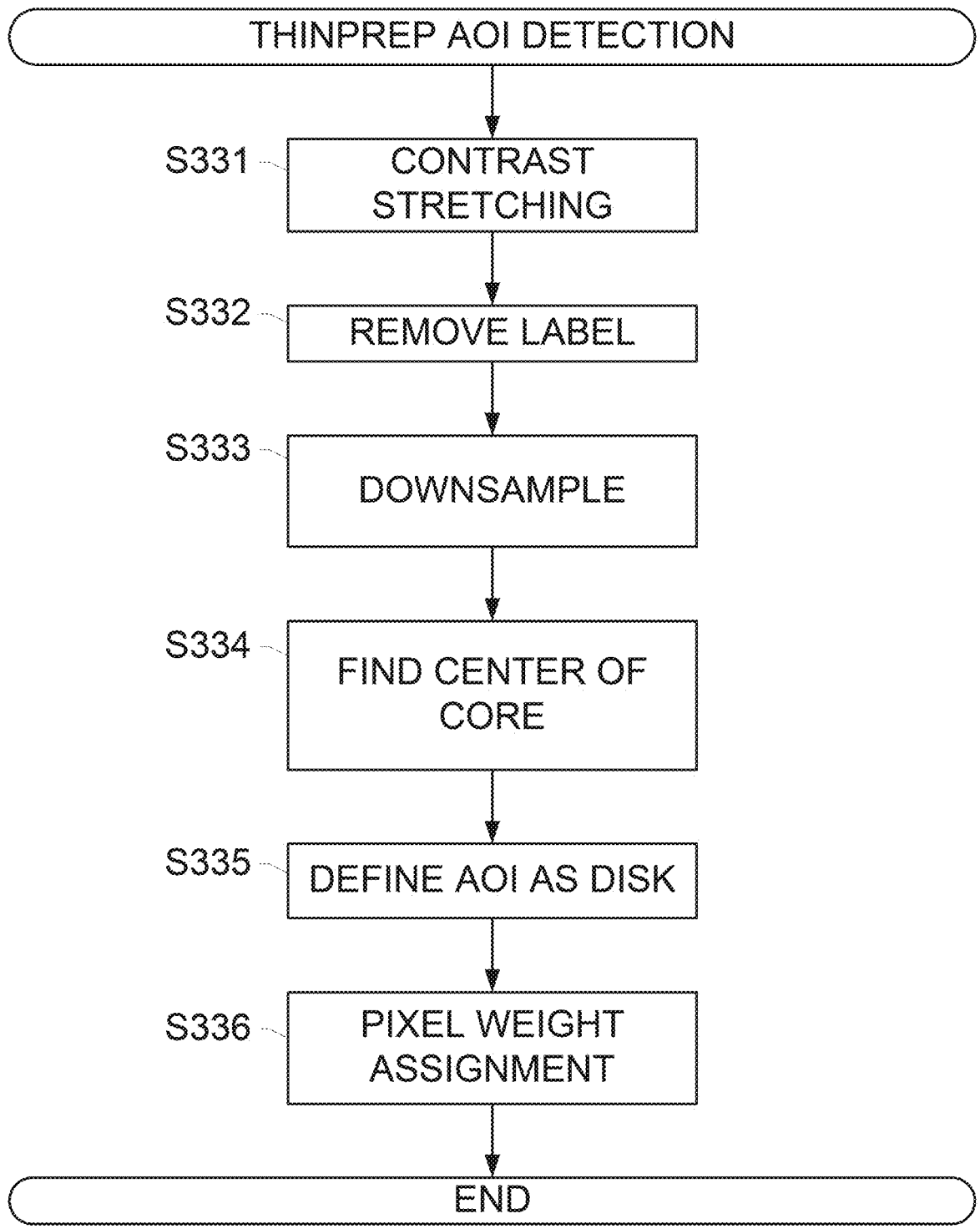
FIGS. 3A-3B depict a method for AOI detection on ThinPrep® slides and results of said method, according to an exemplary embodiment of the subject disclosure.
Figure 3B:
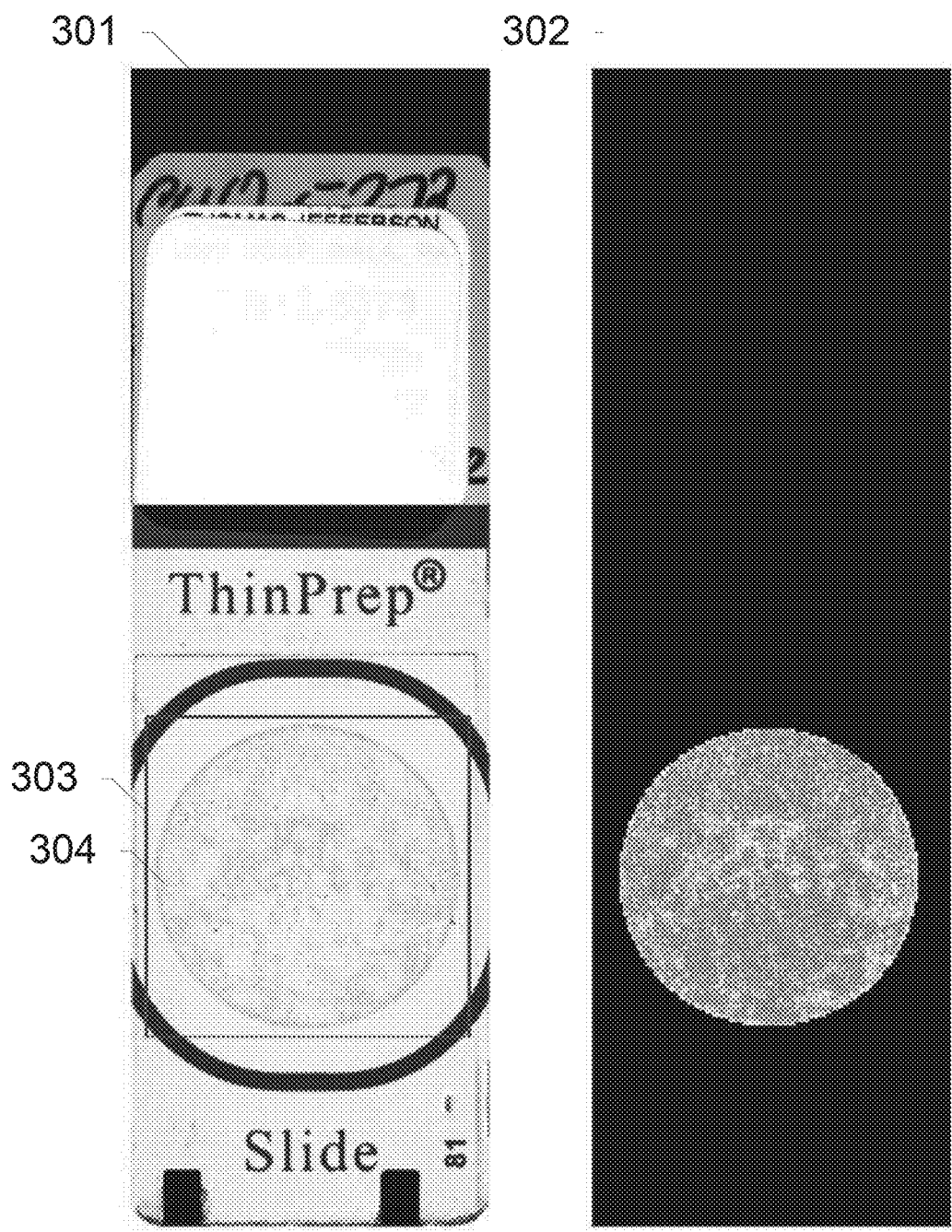

FIGS. 3A-3B depict a method for AOI detection on ThinPrep® slides and results of said method, according to an exemplary embodiment of the subject disclosure. The method of FIG. 3 may be executed by any combination of the modules depicted in the subsystems of FIG. 1, or any other combination of subsystems and modules. The steps listed in this method need not be executed in the particular order shown. In ThinPrep® slides, regions of interest are generally circular and fainter. Therefore, contrast stretching (S331) is performed as an image enhancement operation, enabling a single core (region of interest) to become more prominent. The top several rows of pixels may be discarded to remove the label (S332). For example, empirical observations show that the top 300 rows either have label text or are blank. In other words, the tissue generally lies well below the top 300 rows. Subsequently, in order to enable computing both the likely center of the circular core (S334) and its radius, the thumbnail image is downsampled (S333). For instance, the thumbnail may be downsampled thrice, each time by a factor of 2. A pyramidal approach may be used for faster downsampling. The dowsampled image makes it easier/faster to compute the likely location of the circular core (S334). Radial symmetry based voting may be used to find the most likely core center C (S334). The radial symmetry operation may use a radius range of [42, 55] within the thrice down-sampled image. This corresponds to empirical observations that the radius of the single tissue core in the input image may lie between 336 and 440 pixels. The AOI region is then defined (S335) as the disk obtained at center C (disk radius=mean radius of all points whose votes have accumulated at C). Finally, weights are assigned (S336) to AOI pixels based on luminance and color properties.

Therefore, the general assumptions used by this method are that a single core is present in the image, tissue content that lies in first 300 pixel rows is ignored or discarded, and the radius of the single core should be between 336 and 440 pixels (based on empirical/training observations and on the actual dimensions of slide thumbnail image). FIG. 3B depicts results of the method of FIG. 3A. Image 301 of the ThinPrep® slide is delineated with a rectangle 303 marking an area of interest that includes a tissue blob or core 304. A soft-weighted AOI map 302 (or mask) is returned by the method.

Figure 4A:
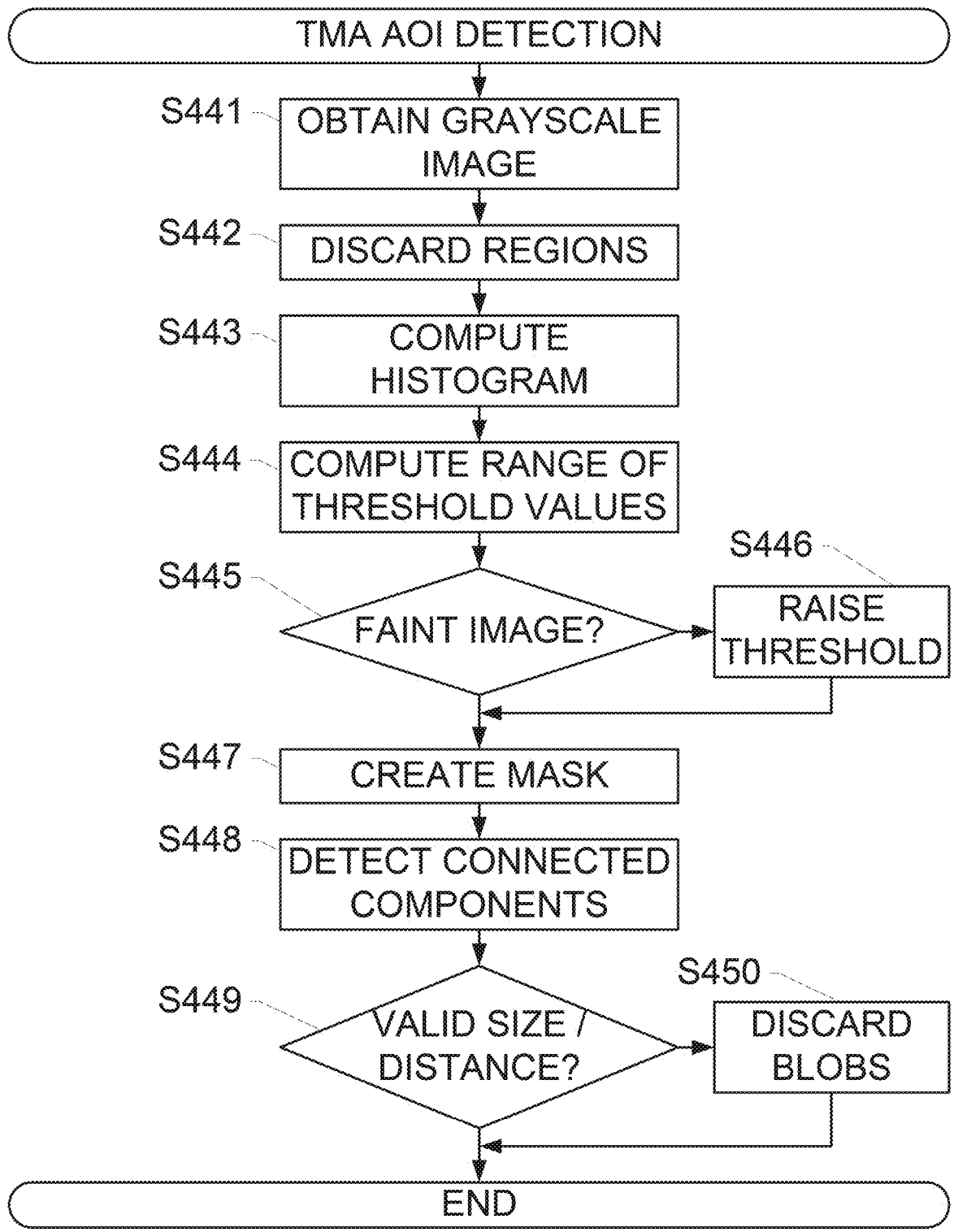
FIGS. 4A-4B depict a method for AOI detection on tissue micro-array (TMA) slides and results of said method, according to an exemplary embodiment of the subject disclosure.
Figure 4B:
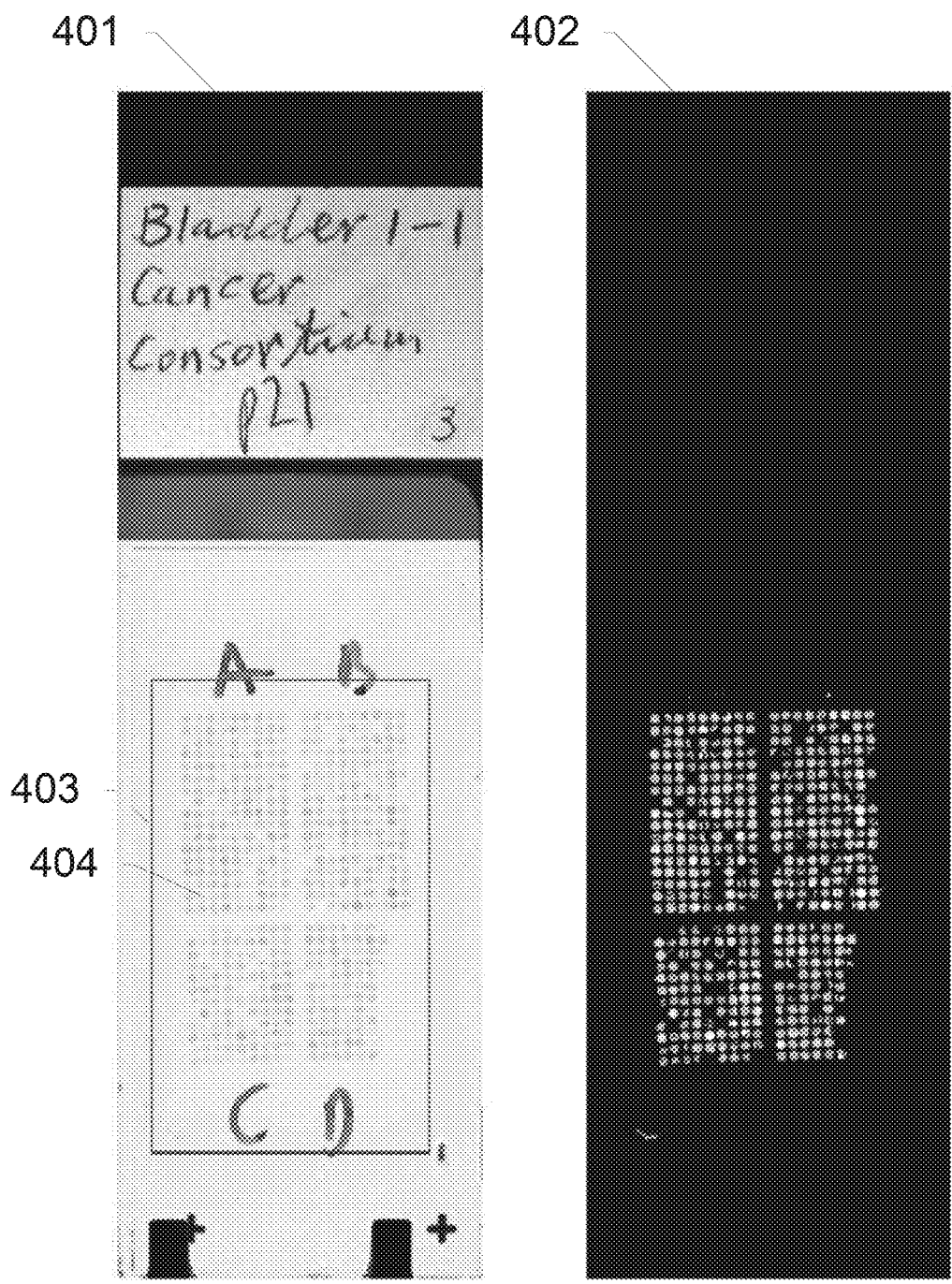

FIGS. 4A-4B depict a method for AOI detection on a tissue micro-array (TMA) slide and results of said method, according to an exemplary embodiment of the subject disclosure. The method of FIG. 4 may be executed by any combination of the modules depicted in the subsystems of FIG. 1, or any other combination of subsystems and modules. The steps listed in this method need not be executed in the particular order shown. Generally, this method is similar to the "generic" method described in FIG. 7A. Of the various blobs present in the thumbnail, it is determined whether or not the different blobs constitute a grid. Size constraints are imposed to discard very small or very large blobs from being potential TMA blobs, and shape constraints used to discard highly non-circular shapes. There may be certain cases where the TMA method branches off to the generic method, such as when only a small fraction of the possible AOI region as obtained from the soft weighted foreground image is captured in the TMA grid.

More specifically the present method starts with obtaining a grayscale image from RGB thumbnail image (S441), and discarding regions (S442) of the image that are known to be irrelevant based on training data. For example, black support tabs at bottom of thumbnail image may be discarded. Cover slip margins may be detected, and regions outside the cover slip margins may be discarded. Dark regions may be detected, i.e. those having gray pixels that are <40 units in intensity (assuming 8-bit thumbnail images), and these dark regions may be discarded from being part of the AOI. The typical width of a coverslip is about 24 mm, but significantly larger or smaller coverslips can be used as well. However, embodiments of the invention assume that there exist not more than one coverslip per slide.

In addition to these regions, margins, pen marks, dark symbols may also be detected and discarded. A control window may be detected, if it exists on the slide. A "control window" as used herein is a region on the tissue slide comprising an additional tissue section with known properties which was subjected to the same staining and/or washing protocol as the tissue sample to be detected and analyzed during image analysis. The tissue in the control window typically acts as a reference image for evaluating if the tissue slide washing, staining and processing was performed correctly. If a control window is found, regions corresponding to the control window borders may be discarded. For cleaner AOI output, regions within 100 pixels of the boundary may also be discarded to help avoid spurious AOI regions closer to margin, and based on the assumption that TMA cores will not lie so close to the thumbnail boundary.

A histogram is then computed (S443) for all remaining valid image regions in the image. Based on image histogram, a range of threshold values may be computed (S444) to perform adaptive thresholding. This operation includes determining regions of pure glass, i.e. where the image histogram peaks at pixel value corresponding to glass, and computing a range $R_A$ of threshold values less than the glass intensity value. Based on the image histogram, it is further determined if the slide is faint enough (S445) and if yes, a range $R_B$ of threshold values is automatically created, where the range $R_B$ is closer to the glass intensity value as compared to range $R_A$. A mask is created (S447) based on the threshold ranges.

According to some embodiments, the range of threshold values may be computed as follows:

Let a pixel intensity value leading to a histogram peak be maxHistLocation (this may correspond to glass).

Let the maximum intensity value in the grayscale image be max_grayscale_index. This value represents a "glass_right_cutoff" value.

According to some embodiments, a range of thresholds is chosen and stored in a vector of elements, labeled, for instance, different_cutoffs, using the following operations:

Let the right gap=max_grayscale_index−maxHistLocation.

Let the glass_left_cutoff=maxHistLocation−rightgap.
Let the interval_range_gap=max(1, round(rightgap/5)).
Let min_rightgap=−rightgap.
Let max_rightgap=min(rightgap−1, round(rightgap*0.75). The value 0.75 is a predefined gap_cutoff_fraction value which typically is in the range of 0.5-0.95, preferentially in the range of 0.7-0.8.
Let different_cutoffs[0]=glass_left_cutoff−2*rightgap.
Let number_interval_terms=(max_rightgap−min_rightgap)/interval_range_gap.

The size of the vector different_cutoffs is (number_interval_terms+2).

For i=0:number_interval_terms−1:
different_cutoffs[i+1]=(glass_left_cutoff−rightgap)+interval_range_gap*i
different_cutoffs[number_interval_terms+1]=glass_left_cutoff+max_rightgap.

Figure 8:
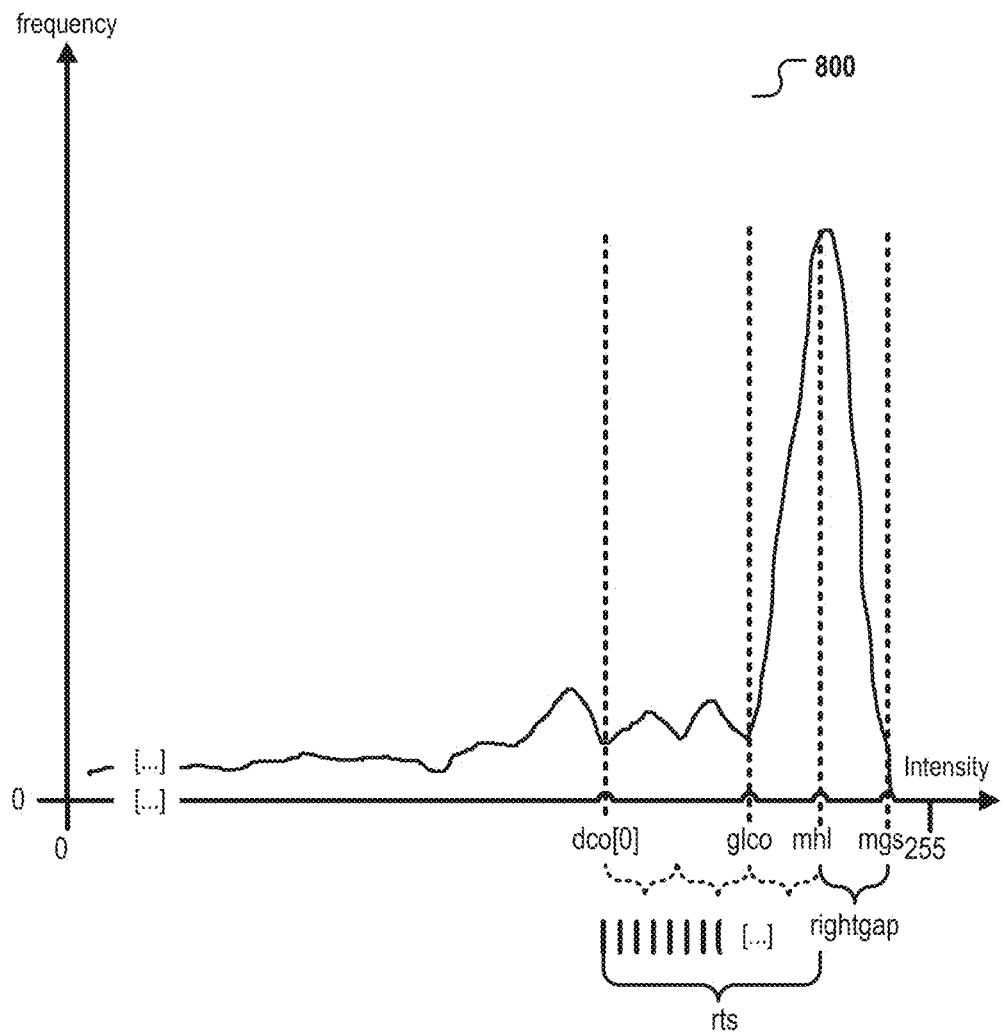
FIG. 8 depicts a histogram of a glass slide comprising a tissue sample, the histogram being used for computing multiple thresholds and corresponding intermediate masks.

FIG. 8 depicts a histogram of a glass slide comprising a tissue sample that may be used according to embodiments of the invention for a range of thresholds and corresponding intermediate masks. Typically, the intensity peak caused by glass regions mhl is located around 245 and typically falls within the range of 235-250, and the mgs typically falls in a range 0-15 units higher than mhl but is limited to a maximum of 255. The basic idea is that in a typical image, the pixels corresponding to glass form a rather symmetrical peak that is just 3-10 units (out of 255) wide on each side. The "rightgap" (mgs-mhl) is the observed width of this peak on the right. "Glass_left_cutoff" is an estimate as to where the glass ends on the left side of this peak. Below that in pixel intensity is typically tissue. However, in particular for faint tissue slides, a single threshold has been observed to not always be able to correctly separate tissue from glass regions. Thus, embodiments of the invention use values identified in a histogram as depicted in FIG. 8 for automatically extracting a range of threshold values rts ranging from a pixel intensity that is very probably tissue up to a pixel intensity that is very probably glass. In the depicted example, the threshold range ranges from dco[0], i.e., from a value lying two rightgaps to the left from glco to a value that is close to mhl. For example, said value lying close to mhl could be computed as Dco[max-i]=different_cutoffs[number_interval_terms+1]=glass_left_cutoff+max_rightgap. It is also possible that simply mhl is chosen as the maximum threshold value in the range of threshold values rts. Depending on the embodiments, the number of thresholds (number_interval_terms) contained in the threshold range its may be predefined or may be computed as a derivative of the value range spanned by the rts.

Each of the thresholds in the its threshold range is applied on the digital image or a derivative thereof (e.g. a grayscale image) for computing a respective mask. The generated masks are iteratively and pair wise merged for generating intermediate masks and finally a single mask M. Thereby, the size of pixel blobs in each mask is compared with empirically determined minimum blob areas and is checked for the occurrence of other blobs in the neighborhood of said blob in the respective other mask.

For example, blobs in of a first mask1 and a second mask2 one of the totality of generated masks may be identified by connected component analysis. In case there are unmasked pixels in mask1 within a distance of e.g. 50 pixels of an i-th blob in mask2 (other distance thresholds typically below 100 pixels may be used as well) and if its total size>=(minimum_area/2), then this blob in mask2 is considered as "true blob" and the unmasked state of its pixels is maintained. If there are no unmasked pixels in mask1 within a distance of e.g. said 50 pixels of pixels in i-th blob mask (i.e. the i-th blob in mask2 is relatively isolated), the pixels of said blob in mask2 are only maintained as unmasked pixels if the blob is larger than e.g. 1.5*minimum_area. The intermediate mask generated by merging mask1 and mask2 comprises the pixels of the blob in mask2 as unmasked pixels only in case said blob is either sufficiently big to exceed a first empirically derived threshold (>1.5*minimum_area) or at least exceeds a second threshold that is smaller than the first threshold (>0.5*minimum_area) and which have at least some unmasked pixels in mask1 in its neighbourhood (within 50 pixels). The value of minimum_area has been empirically determined to be e.g. 150 pixels.

A soft weighted image SW (with values in the range [0,1]) is created using the grayscale image and using different_cutoffs. A binary mask (BWeff) is created (S447) which is ON at all pixels where the soft weighted image>0. For binary mask creation (S447), for all thresholds in different_cutoffs, a binary mask image is created (corresponding pixels in mask image are such where grayscale value<threshold); resulting in a vector of binary mask images. Let this vector of mask images be called masks. Given N elements in masks, another vector of mask images is created, called FinalMask, which has (N−1) elements. A function to combine masks[i] and masks[i+1] to generate FinalMask[i] may be referred to as CombineTwoMasks, and it needs as input the minimum size of a blob. A binary OR operation of all the binary images in FinalMask results in BWeff. The function which takes grayscale, different_cutoffs, minimum_blob_size, as input and returns SW, BWeff as output, is referred to as CreateWeightedImageMultipleCutoffs.

The function to combine two masks, called CombineTwoMasks, may include operations as follows:

Let FinalMask=CombineTwoMasks(mask1, mask2, minimum_area)

Initialization: FinalMask is made of the same size as mask1 and mask2, and all pixels in FinalMask are set to 0.

Perform connected components (CC) on mask2; let number of CC be M

Compute distance transform on mask1; let distance transformed matrix be Dist

For i=1: M (looping over all M connected components), consider i-th CC in mask2 and see whether there are ON pixels in mask1 within a distance of 50 pixels of i-th CC in mask2 (done using knowledge of Dist); if yes, then consider this region only if its total size>=(minimum_area/2) and set all pixels in FinalMask corresponding to i-th CC mask to ON. If there are no ON pixels in mask1 within a distance of 50 pixels of pixels in i-th CC mask (i.e. the i-th CC in mask2 is relatively isolated), consider the CC only when it is big enough, i.e. area of i-th CC based mask>(1.5*minimum_area) and set all pixels in FinalMask corresponding to i-th CC mask to ON. Thus, to summarize, the role of CombineTwoMasks is to consider only those blobs in mask2 which are either sufficiently big (>1.5*minimum_area), or partly big (>0.5*minimum_area) and which have at least some ON pixels in mask1 close enough to it (within 50 pixels). The value of minimum_area has been empirically determined to be 150 pixels.

Once the binary mask BWeff is computed, soft weights are assigned to the pixels based on the grayscale intensity values, with the underlying concept being that pixels which are darker (lower in grayscale intensity values) are more likely to be tissue and hence, will receive higher weight. The soft weights also enable subsequent determination of valid blobs (S449) in subsequent operations, as blobs where the sum of soft weights exceeds a certain threshold may be retained and others discarded (S450). For instance, a blob that is large enough or has enough pixels with a strong "darker" foreground may be valid, and other blobs discarded. To map the soft-weighted image, the input is the grayscale image, and effective binary mask image BWeff, the vector of threshold values called different_cutoffs, and the output is the soft weighted foreground image SW. To determine ON pixels in the effective binary mask BWeff (total number of elements in the different_cutoffs vector is N):

Let norm_value=(grayscale value−different_cutoffs[0])/(different_cutoffs[N−1]−different_cutoffs[0]).

If norm_value>1, norm_value=1; else if norm_value<0, norm_value=0.

Corresponding float value in SW=1−norm_value

If corresponding grayscale value<different_cutoffs[0], corresponding float value in SW=1 (if pixel is dark enough, soft weight value assigned=1).

If corresponding grayscale value>different_cutoffs[N−1], corresponding float value in SW=0 (if pixel is light enough, soft weight value assigned=0).

According to embodiments, the generic tissue region detection routine and one or more of the tissue-slide-type specific tissue region detection routines are further configured for computing a (soft) weighted image from the digital image of the tissue sample, thereby taking a grayscale image of the tissue sample, a mask image (BWeff) and a soft weighted foreground image (SW). In SW, we consider all the pixels between 0.001 and 1, using 21 uniformly spaced bins for the histogram. Depending on the distribution of data in the bins, we decide if the slide is faint enough or not. If the image is faint enough, then the distribution of data in the higher end histogram bins will be low enough; similarly, the distribution of data in the lower end histogram bins will be high enough.

The above mentioned steps of histogram generation, threshold extraction, Mask generation, mask fusion and/or (soft) weight computation may be implemented by a subroutine of the generic and/or one of the tissue-slide-type-specific tissue detection routines.

Once a binary mask is generated (S447) per the steps described above, connected components detection (S448) may be performed to see if each connected component is a possible TMA core. Detected connected components are subject to rules regarding valid size, shape, and distance (S449), as follows:

Width of the connected component (CC)<(cols/6): (width of thumbnail image, below label,=cols)

Height of the CC<(rows/8): (height of thumbnail image, below label,=rows)

Area of CC>55 pixels (small junk blobs may be discarded)

Eccentricity of CC mask>0.62 (TMA cores are assumed to be circular)

After finding possible TMA cores, a distribution of sizes of CC is determined to decide which TMA cores are proper enough:

Let MedianArea=median of all CC retained after the previous step of identifying valid CC.

Retain those CC whose area>=MedianArea/2 and area<=2*MedianArea.

Then, the inter-blob distance of all the valid CC is checked, and the following rule is used to decide whether a blob is to be retained or discarded. The terms used in the rule may include:

NN_distvalues[i]=distance between i-th blob center to center of nearest TMA blob.

radius_current_blob_plus_NN_blob[i]=radius of i-th TMA blob+radius of (blob nearest to i-th TMA blob).

DistMedian=median of (NN_distvalues).

MADvalue=mean absolute deviation of (NN_dist_values).

Sdeff=max(50, 2*MAD).

The rule subject to blobs may be represented as: NN_dist_values[i]<=1.3*(DistMedian+max(Sdeff, radius_current_blob_plus_NN_blob[i])=>for i-th blob to be a valid TMA blob. When TMA cores are considered, the distance between any two nearest cores is generally similar in a TMA, therefore all these assumptions are used in the distance based rules.

Therefore, the TMA algorithm of FIG. 4A is based on the assumptions that the valid TMA cores are small enough, the valid TMA cores are larger than a certain threshold, so as to discard small junk/dirt/dust based blobs, each valid TMA core is circular enough and so eccentricity should be closer to 1, and all valid TMA cores should be close enough and the core-to-nearest-core distance is similar enough such that when this distance constraint is violated, these cores are discarded from the AOI. It may be further assumed that there is no tissue region outside the detected coverslips. For the module that detects dark regions in the image, the assumption is that the pen-marks, symbols, are darker than tissue regions. Therefore, a grayscale value of 40 may be used to discard dark regions. FIG. 4B shows the results of the method of FIG. 4A. Image 401 of the TMA slide is delineated with a rectangle 403 marking an area of interest that includes an array of tissue samples 404. A soft-weighted AOI map 402 (or mask) is returned by the method.

Figure 5A:
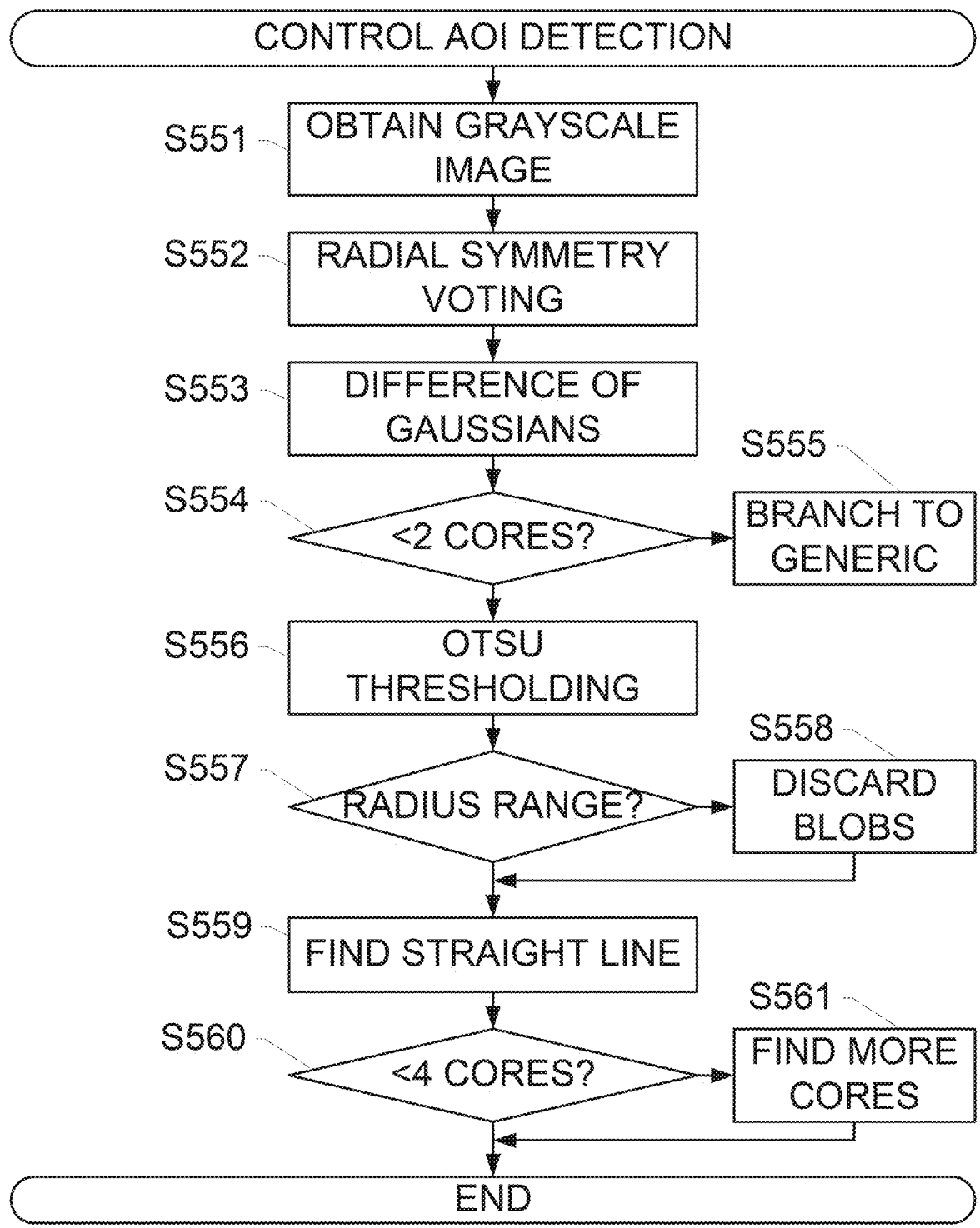
FIGS. 5A-5D depict a method for AOI detection on control slides and results of said method, according to an exemplary embodiment of the subject disclosure.
Figure 5B:

FIGS. 5A-5B depict a method for AOI detection on controls slides and results thereof, according to an exemplary embodiment of the subject disclosure. The method of FIG. 5 may be executed by any combination of the modules depicted in the subsystems of FIG. 1, or any other combination of subsystems and modules. The steps listed in this method need not be executed in the particular order shown. This method is generally used to detect 4 tissue section cores (of the tissue under test, not of the control tissue in a control window of the slide) on a control slide using radial symmetry operations on an enhanced version of the grayscale image with the motivation being that the votes will accumulate at the centers of the 4 cores. A multi-scale difference of Gaussians (DOG) operation is used on the votes image to detect the core centers. The radial symmetry voting helps in accumulation of votes, and when multi-scale DoG is used on the votes image, it helps to better localize the core centers. Then, segmentation techniques may be applied to the regions close to where the core center is found, as the blob is darker than its immediate background and therefore thresholding helps to segment out the cores. Although the method is directed towards "control" slides, it may work for both generic faint slides and also for control HER2 (4-core) images. This method may automatically branch off to the generic method if the thumbnail does not represent a 4-core ControlHER2 image.

Specifically, the method obtains a grayscale image (S551) of the RGB thumbnail, and performs radial symmetry voting (S552) and DOG (S553) on the image to obtain the cores in the image (S554). If the image appears to be a generic tissue slide, with no specific organization, and non-brown in color (control slides are those where control colors are present and control stained tissue is not positively stained), it is determined to not be a 4-core control slide, and the method branches to generic (S555). The determination is accomplished by computing mean and maximum votes from radial symmetry voting (S552) and DOG (S553) for all the detected cores and is based on (mean, max) of (votes, DOG) and the assumption that 4-core slides have higher values of (mean, max) for (votes, DOG). The grayscale image may be downsampled twice to speed up the voting process. For voting, a radius range of [13, 22] pixels may be used for twice down-sampled images. DOG (S553) is performed on the resulting vote matrix, and the top 10 DOG peaks greater than a threshold are used as prospective core center locations. For example based on all the detected core centers, a mean and maximum of DOG for all cores and a mean and maximum of votes for all cores may be computed, with mean_DOG_all_cells_cutoff set to 1.71, max_DOG_all_cells_cutoff set to 2, mean_votes_all_cells_cutoff set to 1.6, max_votes_all_cells_cutoff set to 1.85, and then determine if mean/max of DOG/votes exceeds these cutoffs. If out of 4 conditions, this condition is met for 2 or more cases, it may be decided that the image represents a control slide with 4 cores.

Given prospective core centers, an Otsu thresholding-based segmentation operation (S556) is performed to segment out the foreground blobs, based on the fact that, in general, the core is darker than its immediate background, which makes it possible to extract out the core based on intensity. Once the segmentation (S556) is performed, blobs that do not match (S557) the radius range of [13, 22] may be discarded (S558). Blobs are expected to be circular, so blobs where the computed circularity feature<min_circularity (0.21) are discarded, with circularity being defined as (4*PI*area/(perimeter*perimeter)). Circularity is low for non-circular elongated shapes and is close to 1 for approximately circular shapes.

Of all the remaining cores that are in the valid radius range [13,22], any 4 blobs that lie along a straight line are detected (S559) along with a nearest core distance assumed to be in the range of [38, 68] pixels, i.e. the range between two nearest core centers. To determine whether some blobs are along the same straight line (S559), a blob may be regarded as part of a line where the distance from the blob center is less than a certain distance constraint (23 pixels). If after using these size and distance constraints, fewer than 4 cores are found (S560), detection of additional cores (S561) is attempted to eventually find 4 cores in total, as further described with respect to FIGS. 5C-5D.

Figure 5C:
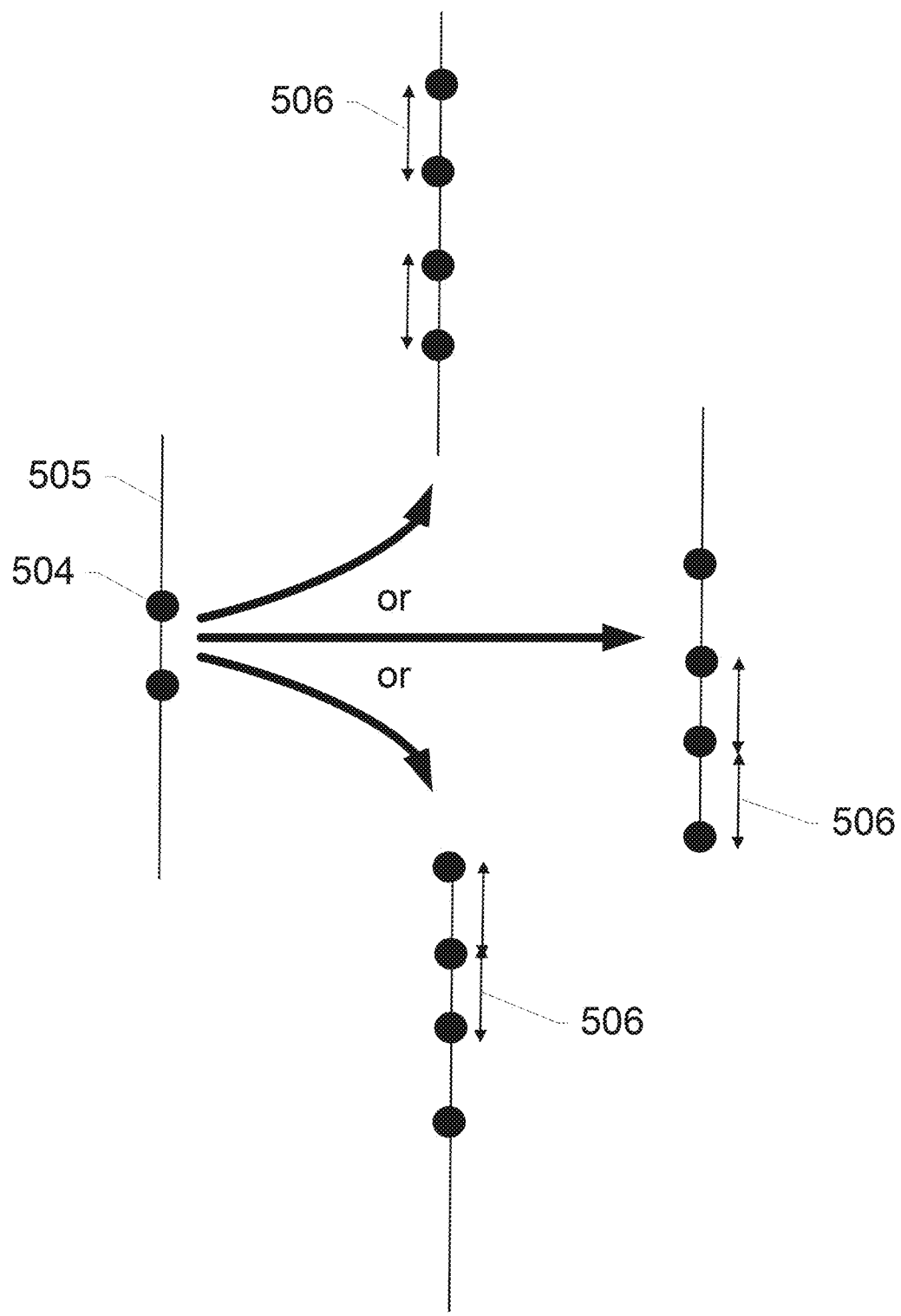
Figure 5D:
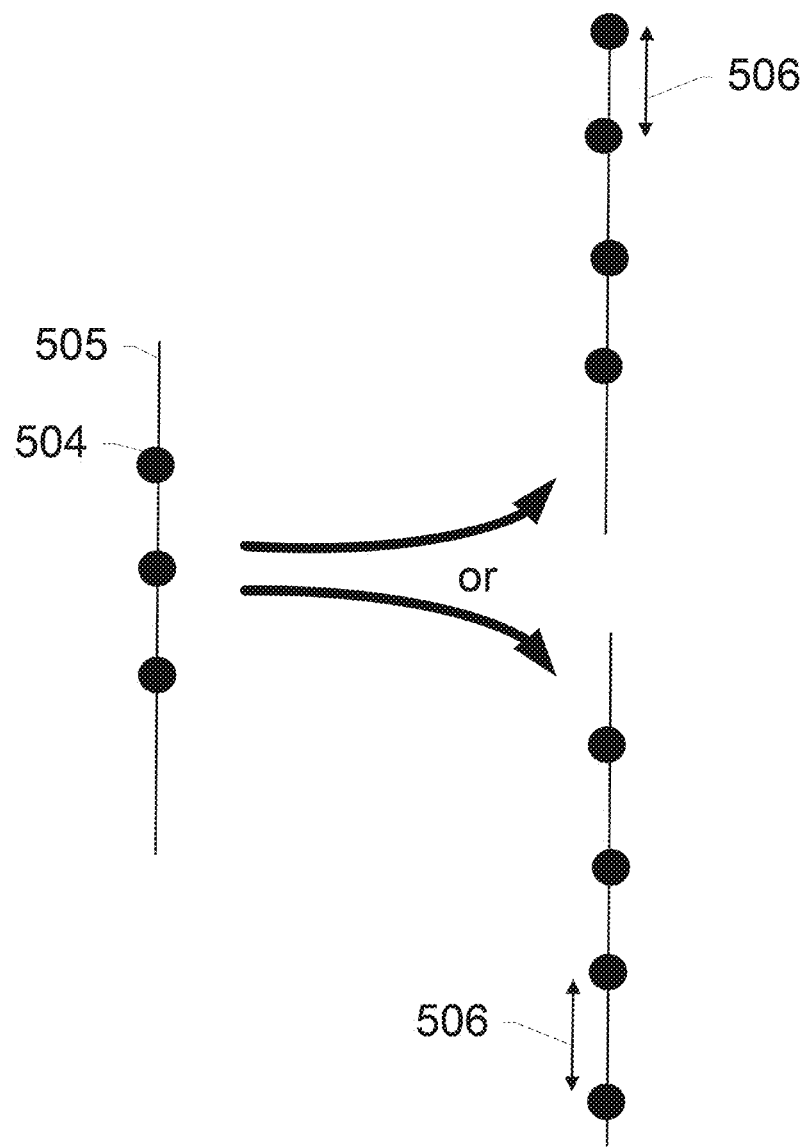

This method generally assumes that 4-core and non-4-core control images can be separated properly if the non-4-core images do not have 5 or more smaller cores. Some 5-core images may be analyzed as generic images. The radius of each core is assumed to be in the range [52, 88] pixels in the thumbnail image. To segment each core, it is assumed to be darker than its immediate background. This makes intensity based thresholding possible on the grayscale version of the thumbnail image. The distance between two nearest cores (for a 4-core Control HER2 thumbnail image)

is assumed to be in the range [152, 272] pixels. FIG. 5B shows results of this method. Thumbnail image 501 of the control slide is delineated with a rectangle 503 marking a tissue slide region that includes cores 504. A soft-weighted AOI map 502 (or mask) is returned by the method. FIGS. 5C-5D depict means for finding more cores (S561). For example, for every detected core 504, the prospective cores are assumed to be 50 pixels away based on arrow 506. A better configuration is one which has more number of valid blobs (i.e. one that matches the size and circularity constraints) and, if both the configurations have the same number of valid blobs, then the circularity feature, averaged over all the valid cores, is compared to settle ties and select the best of the three options. In FIG. 5C, only 2 blobs are found, so the method selects between either of 3 alternate configurations. In FIG. 5D, only 3 blobs are found, so the method selects between the best of 2 alternate configurations.

Figure 6A:
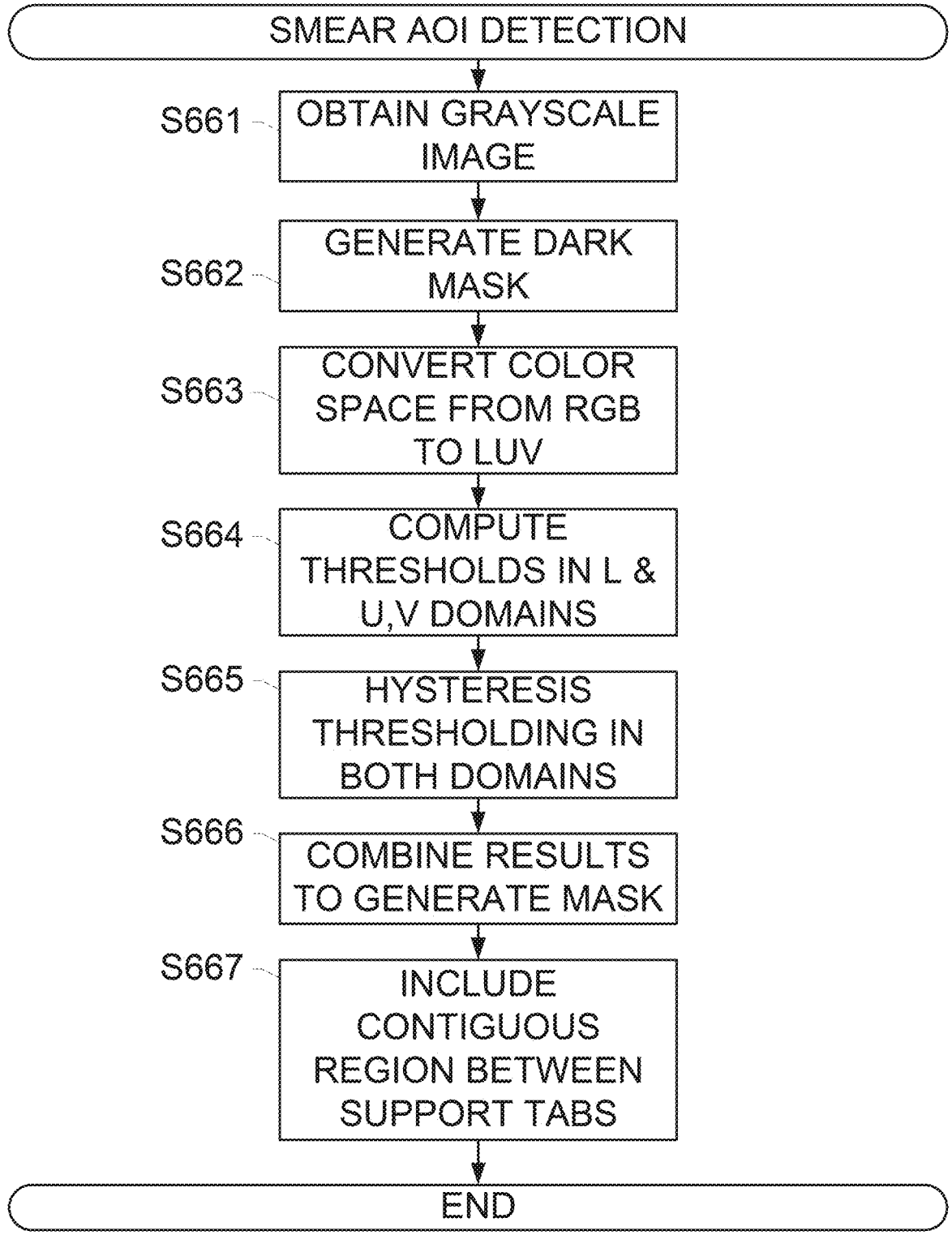
FIGS. 6A-6B depict a method for AOI detection on smear slides and results of said method, according to an exemplary embodiment of the subject disclosure.
Figure 6B:
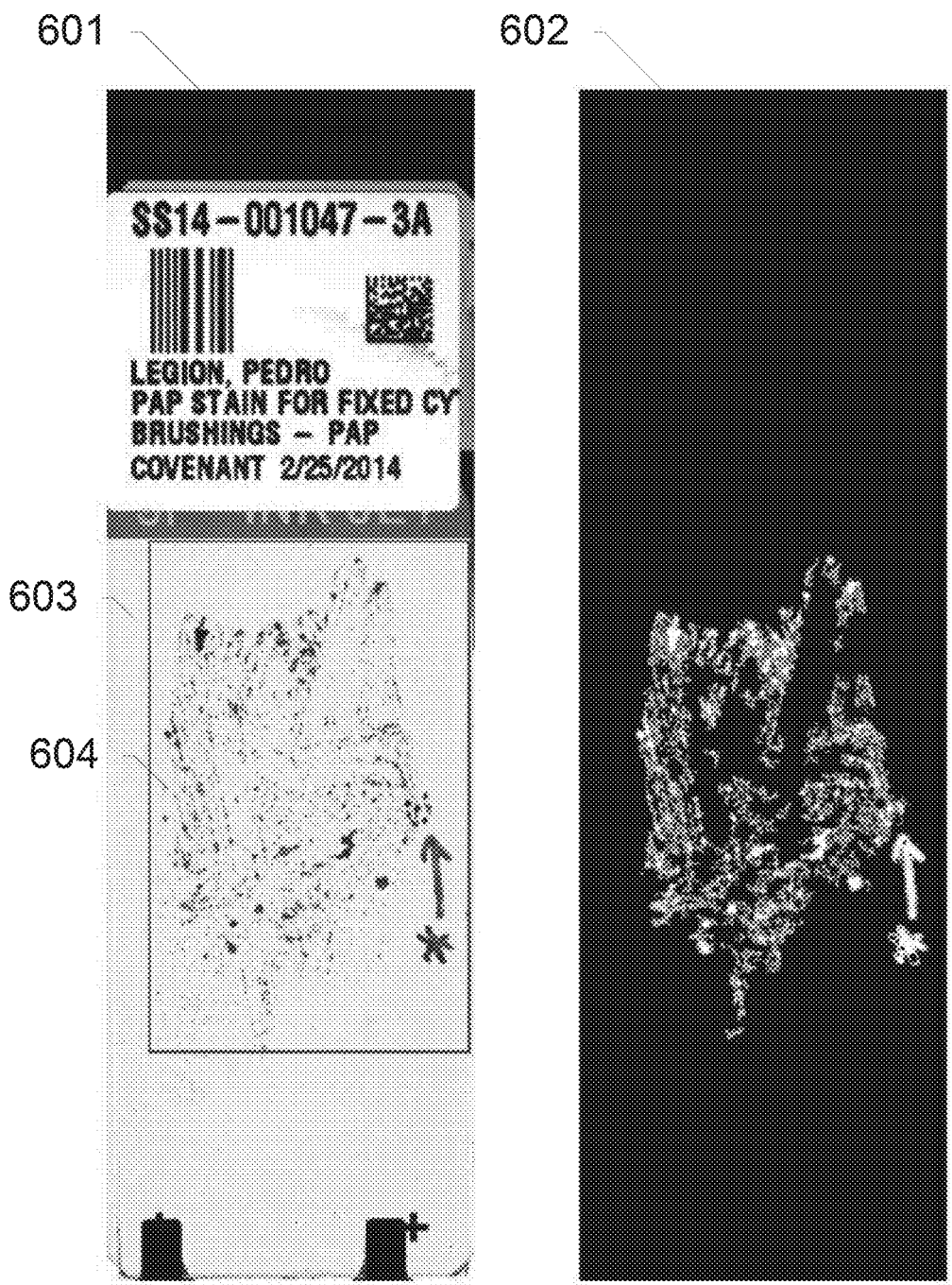

FIGS. 6A-6B depict a method for AOI detection on smear slides (e.g. slides comprising a blood sample), according to an exemplary embodiment of the subject disclosure. The method of FIG. 6 may be executed by any combination of the modules depicted in the subsystems of FIG. 1, or any other combination of subsystems and modules. The steps listed in this method need not be executed in the particular order shown. Generally, the smear method considers two image channels, computed from LUV image which is derived from the RGB image, L and sqrt($U^2+V^2$), where L is the luminance channel and U,V are the chrominance channels. The median and standard deviation are computed for both the L and sqrt($U^2+V^2$) images. Based on lower and higher thresholds computed on median and standard deviation, hysteresis thresholding operations are performed to return separate AOI masks for L and sqt($U^2+V^2$) domains, and then the masks are combined. Post-processing operations may be performed to get rid of spurious regions especially close to the bottom of the slide thumbnail.

Specifically, a grayscale image may be obtained (S661) from the RGB thumbnail image. A dark mask is generated (S662) that corresponds to pixels having grayscale values <40. The RGB image is then converted (S663) to the L, UV sub-channels (L=luminance, U,V: chrominance). The L-channel is also referred to as luminance image. The U- and V-channels are color channels. Thresholds are computed (S664) for both sub-channels, i.e., for the luminance image and for the chrominance image.

For the L channel, an inverted channel L' is computed according to L'=max(L)−L, whereby max(L) relates to the maximum luminance value observed in the L-channel image and L is the luminance value of a pixel. Then, a median (MedianL) and mean absolute deviation (MADL) are computed for the L' channel.

The chrominance image UV is computed according to UV=sqrt($U^2+V^2$).

For the L' channel, a lower threshold $thL_{low}$ is computed according to $thL_{low}$=MedianL+MADL, and a higher threshold $thL_{high}$ is computed according to $thL_{high}$=MedianL+2*MADL.

A similar method is used to compute the thresholds on the UV channel.

The chrominance image UV is computed according to UV=sqrt($U^2+V^2$).

An inverted channel UV' is computed according to UV'=max(UV)−UV, whereby max(UV) relates to the maximum luminance value observed in the UV− image and UV is the chrominance value of a pixel in said image. Then, a median (MedianUV) and mean absolute deviation (MADUV) are computed for the UV' channel.

For the chrominance UV channel, a lower threshold $thUV_{low}$ is computed according to $thUV_{low}$=MedianUV+MADUV, and a higher threshold $thUV_{high}$ is computed according to $thUV_{high}$=MedianUV+2*MADUV.

Then, hysteresis thresholding (S665) is performed on both channels (L', UV'). On the L' channel, hysteresis thresholding using $thL_{low}$ and $thL_{high}$ and using an area constraint of e.g. 150 pixels is used to obtain a binary mask in L' domain ($M_{L'}$).

Hysteresis thresholding on the UV channel uses an area constraint of e.g. 150 pixels to obtain a binary mask in UV domain ($M_{U,V}$).

"Using an area constraint" in hysteresis thresholding means that any pixel blob detected by the hysteresis thresholding (as being a set of adjacent pixels having a value that meets the lower and the upper threshold) is only maintained as an "unmasked" pixel blob in the generated mask if said blob is at least as large as the area constraint. The size of the area constraint is typically in the range of 130-170 pixels, e.g. 150 pixels.

The final effective binary mask M is obtained by a binary OR combination (S666) of $M_{L'}$ and $M_{UV}$ (M(x,y)=1 if ML'(x,y)=1 or MUV(x,y)=1).

Performing the hysteresis thresholding on the two different masks generated from a luminance and from a chrominance image separately and then recombining the thresholded masks may increase accuracy of tissue-vs-glass region detection in particular for smear slides. This is because the tissue regions on the glass slide typically consist of cells spread out over the whole slide. Often said cells have low contrast relative to the glass slide. Nevertheless, the color component represented in the chrominance image may act as a clear indicator that a particular slide region is covered by tissue.

The resulting combination may be soft-weighted as described herein to generate the final mask. Moreover, the region in between the support tabs, at bottom of thumbnail image, is analyzed (S667) to determine if any tissue region in between the support tabs that is contiguous with tissue AOI region which has already been detected needs to be included in the mask.

This method generally assumes that any cover slip detection may result in discarding smear tissue, so tissue regions outside the cover slip are discarded automatically. The benefit here is that if tissue does not extend to the sides/edges, the coverslip margins are ignored. Moreover, since smear tissue can lie in between support tabs, it is assumed to be genuine tissue, particularly if it is connected with the tissue already detected in the region outside support tabs. For this method, after the AOI is found, smaller connected components are not discarded based on the assumption that smear tissue may not consist of concrete blobs but there can be pieces of tissue lying near the prominent smear portion which can be small enough in area. Since missing tissue regions is more risky than capturing spurious regions, a conservative approach includes retaining the smaller connected components in the AOI. FIG. 6B shows results of this method. Thumbnail image 601 of the smear slide is delineated with a rectangle 603 marking an area of interest that includes a tissue smear 604. A soft-weighted AOI map 602 (or mask) is returned by the method.

Figure 7A:
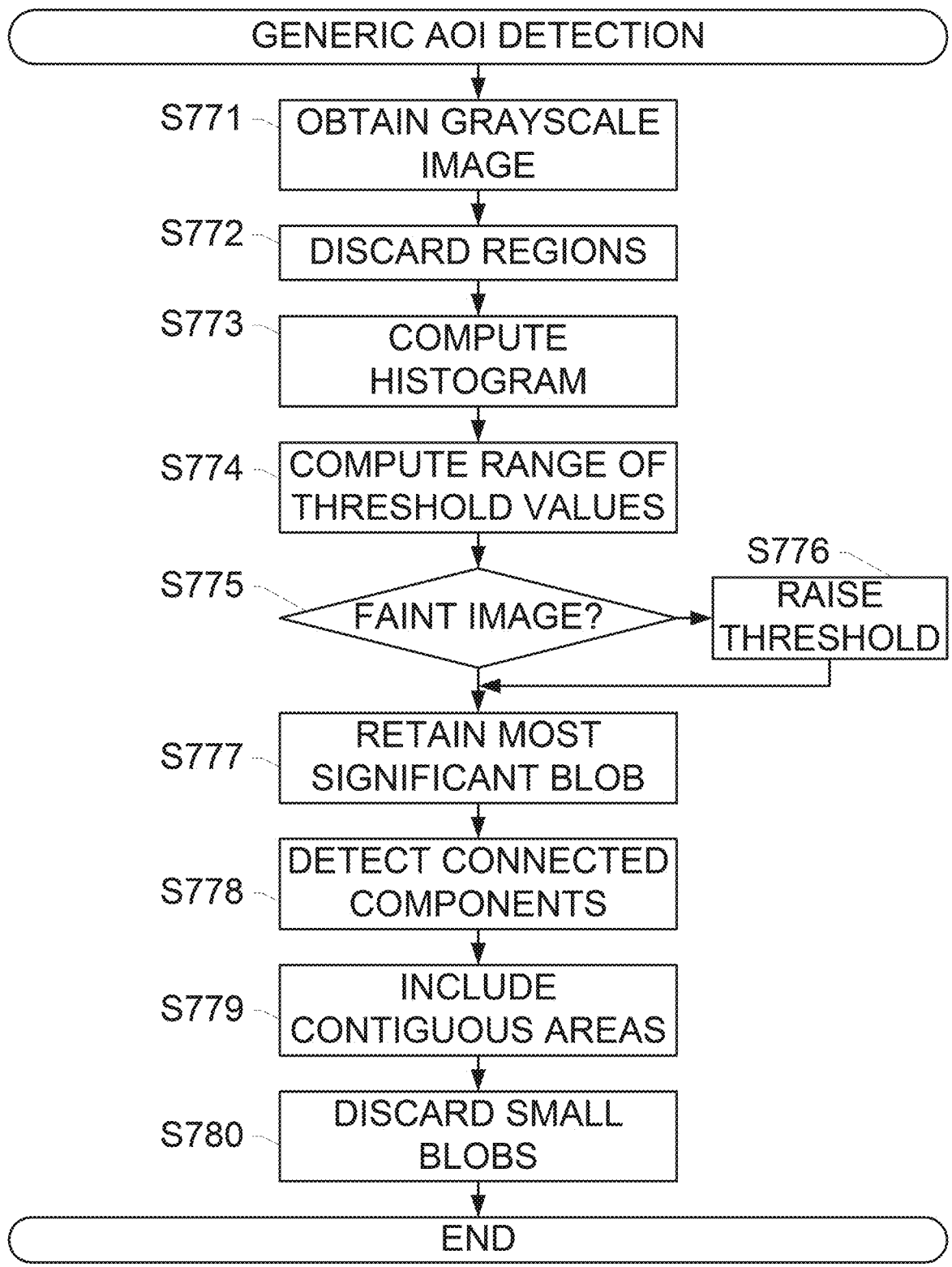
FIGS. 7A-7C depict a default method for AOI detection and results of said method, according to an exemplary embodiment of the subject disclosure.
Figure 7B:
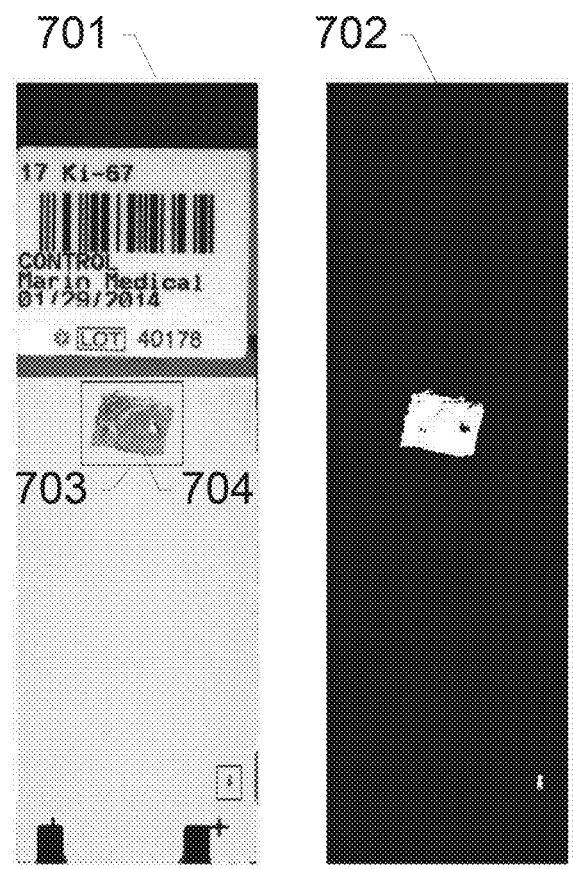
Figure 7C:
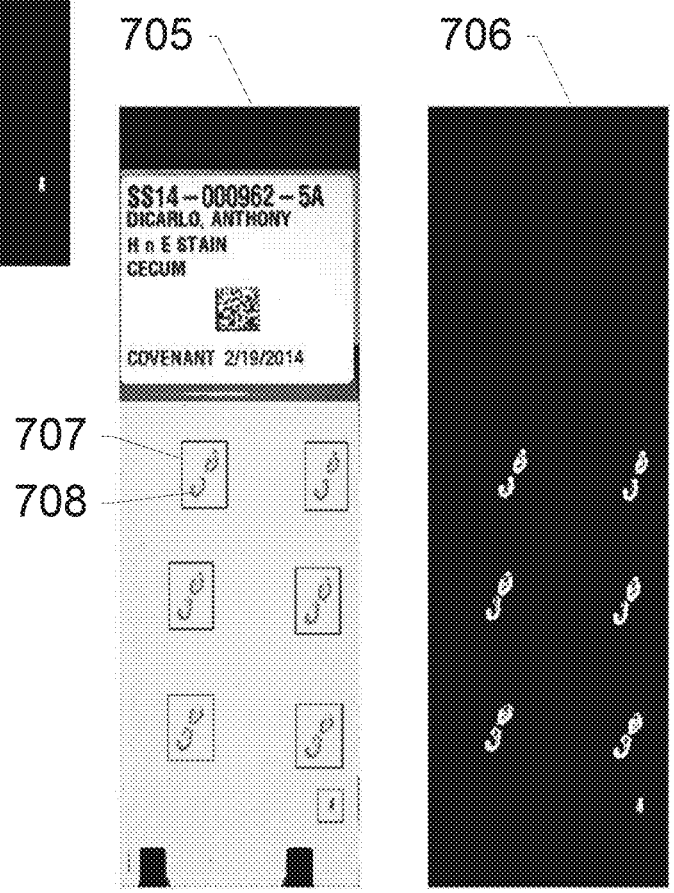

FIGS. 7A-7C depict AOI detection for generic or misidentified slides, according to exemplary embodiments of the subject disclosure. The method of FIG. 7 may be executed by any combination of the modules depicted in the subsystems of FIG. 1, or any other combination of subsystems and modules. The steps listed in this method need not be executed in the particular order shown. Generally, this method uses a variety of thresholds to come up with a soft weighted image where higher probability of finding tissue regions is expected, and to discard faint image regions from a faint artifact based on the assumption that faint regions close to darker tissue regions are more likely to be tissue regions than faint regions which are more distant from genuine tissue regions.

The method begins by obtaining a grayscale image (S771) from the RGB thumbnail image, and discarding regions (S772) that are known not to be of interest. For example, black support tabs at bottom of thumbnail image are discarded, as well as regions outside a detected margin of a cover slip. Dark regions having grayscale values <40 are discarded from being part of AOI, as well as any regions outside a margin or border of a control window (if any is detected). An image histogram is computed (S773) for all image regions not discarded previously, based on which a peak value for glass is obtained and used to compute the range of threshold values over which adaptive thresholding is performed to detect prospective tissue regions. These operations S773-S776 are analogous to those performed by the TMA method described with reference to FIG. 4A. However, in this case, if the image is a faint image, the most significant blob is retained (S777), i.e. where the sum of the soft weights of all the pixels belonging to the blob is at a maximum. Further, smaller blobs close to this most significant blob are retained when the soft weights are high enough and are close enough to the most significant blob. Connected components are detected (S778), and size, distance, and soft weights constraints applied (S779-S780) to retain and discard blobs. The result is an AOI mask. Further, pixels in the 100-pixel-wide border region—when there are proper tissue regions in the interior part which may touch tissue regions in the zeroed out part, are considered as part of the AOI mask. Small blobs are discarded (S780) based on size, distance constraint, proximity to dark support tabs at bottom, soft weight constraints, etc.

This default or generic method assumes that there is no tissue region outside the detected cover slips, because if the coverslip is incorrectly detected (e.g. when there are line-like patterns in the tissue region), it runs the risk of zeroing out all regions outside the false cover slip. Further, for the module that detects dark regions in the image, the intuition is that the pen-marks, symbols, are darker than tissue regions. The method further assumes a grayscale value of 40 to discard dark regions. Blobs are considered small if they are <150 pixels, and discarded if they are not within a certain distance (<105 pixels) from any other significant non-small blob. Pixels, with soft weight >0.05 and within 75 pixels of the most significant blob, are regarded as part of the AOI.

As described above, these AOI detection algorithms have been trained using ground truths established from 510 training slides that contained at least 30 slides from each of all the 5 categories. The algorithm was further tested on a test set of 297 slide thumbnails, different from the training set. Based on the ground truth AOI data, precision and recall scores were computed and it was observed that for all the 5 slide types, the precision-recall based score obtained using the these methods was markedly superior than prior art methods. These improvements may be attributed to several features disclosed herein, including but not limited to adaptive thresholding (which uses a range of threshold values versus one single statistically found threshold as was generally done in the prior art), or a lower and higher threshold as in the case of hysteresis thresholding, connected component detection performed on the binary mask to discard smaller blobs, and using a range of threshold values to remove dependence on a single chosen threshold, as well as considering the distance between smaller (yet significant) blobs and bigger blobs (which is significant as small variations in intensity can split larger blobs and smaller yet important blobs can get discarded by prior art methods). The operations disclosed herein may be ported into a hardware graphics processing unit (GPU), enabling a multi-threaded parallel implementation.

In a further aspect, the invention relates to an image analysis system configured for detecting a tissue region in a digital image of a tissue slide. A tissue sample is mounted on the slide. The image analysis system comprises a processor and a storage medium. The storage medium comprises a plurality of slide-type specific tissue detection routines and a generic tissue detection routine. The image analysis system is configured for performing a method comprising:

selecting one of the slide-type specific tissue detection routines;

checking, before and/or while the selected slide-type specific tissue detection routine is performed, if the selected slide-type specific tissue detection routine corresponds to the tissue slide type of the slide depicted in the digital image;

if yes, automatically performing the selected slide-type specific tissue detection routine for detecting the tissue region in the digital image if no, automatically performing the generic tissue detection routine for detecting the tissue region in the digital image.

Said features may be advantageous as a fully automated image analysis system is provided capable of identifying tissues in a plurality of different slide types. In case a wrong slide type and corresponding tissue analysis method is selected by a user or automatically, the system may automatically determine a wrong selection and will perform a default tissue detection routine that has been shown to work well for all or almost all types of tissue slides, also. The embodiments described in the following can freely be combined with any of the above described embodiments.

According to embodiments, the digital image is a thumbnail image. This may be beneficial as thumbnails have a lower resolution compared to "full sized" tissue slide images and may thus be processed more efficiently.

According to embodiments, the image analysis system comprises a user interface. The selection of the slide-type specific tissue detection routine comprises receiving a user's selection of a tissue slide type via the user interface; and selecting the one of the slide-type specific tissue detection routines assigned the tissue slide type selected by the user.

According to embodiments, the generic tissue detection routine and one or more of the slide-type specific tissue detection routines (the TMA routine) comprise a sub-routine for generating a binary mask M that selectively masks non-tissue regions. The sub-routine comprises:

computing a histogram of a grayscale version of the digital image;

extracting a plurality of intensity thresholds from the histogram;

applying the plurality of intensity thresholds on the digital image for generating a plurality of intermediate masks from the digital image;

generating the binary mask M by combining all the intermediate masks.

According to embodiments, the extraction of the plurality of intensity thresholds from the histogram comprises:
identifying a max-grayscale-index (mgs), the max-grayscale-index being the maximum grayscale intensity value observed in the histogram;
identifying a max-histogram-location (mhl), the max-histogram-location being the grayscale intensity value having the highest occurrence frequency in the histogram;
computing a rightgap by subtracting the maximum-histogram-location (mhl)from the max-grayscale-index (mgs);
computing a glass-left-cutoff according to glass-left-cutoff=max-histogram-location(mhl)-rightgap;
performing the extraction of the plurality of thresholds such that the lowest one (dco[0]) of the thresholds is an intensity value equal to or larger than glass_left_cutoff−rightgap and such that the highest one of the thresholds is equal to or smaller than glass_left_cutoff+rightgap. For example, the lowest threshold can be an intensity value equal to or larger than glass_left_cutoff−rightgap+1 and the highest one of the thresholds can be equal to or smaller than glass_left_cutoff+rightgap−1.

Said features may be advantageous as the thresholds are histogram based and therefore dynamically adapt to the faintness of the tissue- and non-tissue regions of the slide that may depend on many different factors such as light source, staining intensity, tissue distribution, camera settings and the like. Thus, a better comparability of images of different tissue slides and a better overall accuracy of the tissue detection may be achieved.

According to embodiments, the extraction of the plurality of intensity thresholds from the histogram comprises:
computing an interval-range-gap(irg) according to irg=max(1, round(rightgap/constant)), wherein constant is a predefined numerical value between 2 and 20, preferentially between 3 and 8;
computing a max_rightgap value according to max_rightgap=min(rightgap−1, round (rightgap*gap_cutoff_fraction), wherein the gap_cutoff_fraction is a predefined value in the range of 0.5-0.95, preferentially 0.7-0.8;
computing a number_interval_terms according to number_interval_terms=((max_rightgap+rightgap)/interval_range_gap); and
creating the plurality of threshold such that their number is identical to the computed number_interval_terms.

Said features may be advantageous because the number of generated thresholds are histogram based and therefore are dynamically adapted to the faintness and intensity distribution of the tissue- and non-tissue regions of the slide that may depend on many different factors such as light source, staining intensity, tissue distribution, camera settings and the like. It has been observed that in case the glass-related intensity peak is very narrow, a smaller number of thresholds may be sufficient for accurately separating tissue regions from glass-regions. In case the glass-related intensity peak is very broad and correspondingly the rightgap is large, it may be preferably to compute a larger number of thresholds and corresponding masks According to embodiments, the application of the plurality of intensity thresholds on the digital image for generating a plurality of intermediate masks comprises:
a) creating a first intermediate mask by masking all pixels in the digital image whose grayscale value is below a first one of the plurality of thresholds;
b) creating a second intermediate mask by masking all pixels in the digital image whose grayscale value is below a second one of the plurality of thresholds; the second threshold may be, for example, the next highest ones of the plurality of thresholds;
c) performing a connected-component-analysis on the unmasked pixels of the first mask for identifying first blobs;
d) performing a connected-component-analysis on the unmasked pixels of the second mask for identifying second blobs;
e) merging the first and second mask into a merged mask, the merging comprising:
masking all first blobs whose size is below an absolute-minimum-area and masking all first blobs whose size is above the absolute-minimum-area but below a conditional-minimum-area and which lack a first blob in a predefined neighborhood area around said first blob;
after having performed the masking of one or more of the first blobs, unifying the unmasked regions of the first and second mask to generate the unmasked regions of the merged mask, all other regions of the merged mask being masked regions;
using the merged mask as a new first intermediate mask, selecting a third one of the threshold for computing a new second intermediate mask from the third threshold, repeating steps c)-e) until each of the plurality of thresholds was selected, and outputting the finally generated merged mask as the merged binary mask M.

The multi-threshold based multi-mask merging as described above may be advantageous as different thresholds are capable of catching dots or blobs of tissue of very different intensity levels. In case one mask misses a blob, said blob may be caught by a mask based on a less strict threshold. Further, the way the masks are combined prevents that the masks are polluted by noise, because context information of two different masks is evaluated. An unmasked pixel blob of a mask is only maintained in the mask merging process if said blob is either very large or is in spatial proximity to a blob detected in the other mask. Such a finding will typically be made if a tissue region is analyzed, but not if an artifact in a glass region is analyzed. The merging of a luminance-based mask and of a chrominance-based mask is performed in the same way as described above, whereby the luminance mask may for example be used as the first mask, the chrominance mask may be used as the second mask and a connected component analysis is performed for detecting first and second blobs in unmasked regions of the luminance and chrominance channel, respectively.

According to embodiments, the absolute-minimum-area is in the range of 100%-200% of an expected size of a blob representing a tissue cell, the conditional-minimum-area being in the range of 30%-70% of an expected size of a blob representing a tissue cell. The predefined neighborhood area around a blob may be defined by a pixel belt around a blob having a width of about 1-3 diameters of a typical tissue cell, e.g. a width of 50 pixels.

According to embodiments, the slide-type specific tissue detection routines comprise a TMA-slide-routine. The TMA-slide routine is configured for detecting the tissue region in a tissue micro array (TMA) slide. The TMA-slide routine is configured for:
generating a binary mask M by performing the sub-routine according to embodiments described above;

applying the binary mask (M) on the digital image and selectively analyzing unmasked regions in the digital image for detecting a grid of tissue regions. A "core" as used herein is an individual tissue sample or part thereof contained on a slide that is separated from other tissue regions on the slide (other "cores") by a predefined minimum distance, e.g. at least two or more mm.

Embodiments of the invention make use of a plurality of thresholds for intermediate mask generation and then combine the masks for generating a final mask. The image analysis system uses the final mask for identifying tissue regions. Applying multiple different thresholds for mask generation and then combining the masks via a smart mask marking algorithm has been observed to provide higher accuracy in tissue-vs-glass detection. The way the multiple thresholds are generated and the respective masks are fused may slightly vary for the different tissue slide types to further increase the accuracy of the tissue detection algorithm.

According to embodiments, the selected slide-type specific tissue detection routine is a TMA-slide routine and the image analysis system is further configured for:
  if the grid of tissue regions is not detected in the unmasked regions of the digital image, determining that the selected TMA-slide tissue detection routine does not correspond to the tissue slide type of the tissue slide depicted in the digital image; and
  terminating execution of the TMA-slide tissue detection routine and starting execution of the generic tissue detection routine.

According to embodiments, the slide-type specific tissue detection routines comprise a control-slide-routine. The control-slide routine is configured for detecting the tissue region in a control slide. A control slide is a slide comprising a control tissue in addition to the tissue that is to be analyzed. The control tissue and the tissue to be analyzed are stained with a control stain, i.e., a biomarker-unspecific stain, but not with a biomarker-specific stain. Due to the control stains, control tissue sections and the tissue sections to be actually analyzed are never positively stained and are typically fainter than experimental test slides. The control-slide routine is configured for:
  generating a binary mask M by performing the sub-routine of any one of the above described embodiments for binary mask generation.
  applying the binary mask M on the digital image; and
  selectively analyzing unmasked regions in the digital image for detecting a number of tissue regions positioned in a straight line.

According to embodiments, the selected slide-type specific tissue detection routine is a control-slide routine. In case the number of tissue regions in a straight line are not detected in the unmasked regions of the digital image, the image analysis system determines that the selected control-slide tissue detection routine does not correspond to the tissue slide type of the tissue slide depicted in the digital image and terminates execution of the control-slide tissue detection routine and starting execution of the generic tissue detection routine.

According to embodiments, the slide-type specific tissue detection routines comprise a cell-line-slide-routine. The cell-line-slide-routine is configured for detecting the tissue region in a cell-line-slide. A cell-line-slide is a tissue slide comprising a single, disc-shape tissue sample, the cell-line-slide routine being configured for:

computing a grayscale image as a derivative of the digital image; according to some embodiments, the grayscale image is an "enhanced" image, e.g. by means of contrast stretching. The (enhanced) grayscale image is, according to embodiments, down-sampled (stored with reduced resolution) multiple times (e.g. trice with factor of 2) before the gradient magnitude image is computed.
computing a gradient magnitude image as a derivative of the grayscale image;
computing a histogram of the digital image;
extracting a plurality of intensity thresholds from the histogram;
applying a plurality of intensity threshold values on the digital image for generating a plurality of intermediate masks from the digital image;
generating a binary mask (M) by combining all the intermediate masks;
applying the binary mask (M) on the digital image and the gradient magnitude image; and
performing radial symmetry based voting selectively on the unmasked region in the gradient magnitude image for detecting a center and a radius of a single tissue region.

According to embodiments, the selected slide-type specific tissue detection routine is a cell-line-slide routine and the image analysis system is further configured for:
  if the single tissue region was not detected or if the detected radius or the detected location of the center deviates from a radius or center location expected for the cell-line-slide type, determining that the selected cell-line-slide tissue detection routine does not correspond to the tissue slide type of the tissue slide depicted in the digital image; and
  terminating execution of the cell-line-slide tissue detection routine and starting execution of the generic tissue detection routine.

According to embodiments, the slide-type specific tissue detection routines comprises a smear-slide-routine. The smear-slide routine is configured for detecting the tissue region in a smear slide. A smear slide is a slide type where on which the tissue region is diffused throughout the slide. The smear-slide routine is configured for:
  computing a luminance image as a derivative of the digital image, the luminance image being an L-channel image of a LUV color space representation of the digital image;
  computing a chrominance image as a derivative from the digital image, the chrominance image being a derivative of the U,V-channels of the LUV color space representation of the digital image;
  performing hysteresis thresholding on an inverted version of the luminance image for generating a luminance-based mask;
  performing hysteresis thresholding on an inverted version of the chrominance image for generating a chrominance-based mask;
  combining the luminance-based mask and the chrominance-based mask to obtain a binary mask (M);
  applying the binary mask on the digital image; and
  selectively analyzing unmasked regions in the digital image for detecting the diffused tissue region.

According to embodiments, performing the hysteresis thresholding comprises:
  determining, for each set of adjacent pixels whose pixel value meets a lower and an upper threshold applied during the hysteresis thresholding, if the set of pixels covers at least an empirically determined area; for example, the empirically determined area can correspond to a typical number of pixels of a tissue cell depicted in the digital image at the given resolution;

if yes (if the pixel set covers at least said area), generating the binary mask such that said set of pixels is unmasked; considering said pixels as unmasked pixels implies that said pixels are considered as tissue regions while the masked pixels are considered as non-tissue regions, e.g. glass regions;

if no, generating the binary mask such that said set of pixels is masked.

Comparing the adjacent sets of pixels may have the advantage that small speckles and noise that is smaller than a typical cell is filtered out by the generated mask.

According to embodiments, the tissue slide is a glass slide and the tissue detection routines are configured for generating masks that selectively mask glass regions, wherein tissue regions are unmasked regions in said masks.

According to embodiments, the sub-routine further comprising using size and distance constraints to detect and discard smaller regions from intermediate masks when combining the intermediate masks to generate the binary mask.

According to embodiments, the generic and one or more of the tissue-slide-type-specific tissue detection routines are further configured for generating a weighted image from the digital image, each pixel in the weighted image having assigned a weight in a value range comprising more than two different values. The weight indicates a likelihood that said pixel belongs to a tissue region as compared to belonging to glass. This may be advantageous, as a mask merely generates a binary image but the likelihood of being a tissue region rather a glass region may be between zero and one. For some pixels it may hardly be possible to unambiguously decide if they are tissue pixels or not. By assigning weights that may have any of a plurality of possible values, it is possible to display to a user some prospective tissue regions having a high likelihood of being truly a tissue pixels and some prospective tissue regions having a lower likelihood of being a tissue region (but nevertheless being unmasked and thus being considered as a tissue region).

According to embodiments, the generating of the weighted image uses the digital image as well as a binary mask M as an input. The soft-weighted image is zero valued at all pixels except the pixels which are non-zero inside the binary mask, and these non-zero pixels get assigned higher or lower values depending on whether they are more or less likely to belong to tissue as compared to belonging to glass.

According to embodiments, the generation of the weighted image comprising:

computing a luminance image as a derivative of the digital image, the luminance image being an L-channel image of a LUV color space representation of the digital image, or accessing a luminance image having been computed already for generating a binary mask (M);

computing a chrominance image as a derivative from the digital image, the chrominance image being a derivative of the U,V-channels of the LUV color space representation of the digital image, or accessing a chrominance image having been computed already for generating the binary mask M;

masking the luminance and/or the chrominance with a binary mask (M), the binary mask selectively masking non-tissue regions;

generating a weighted image SW as a derivative of the luminance and/or the chrominance image, wherein each pixel in the weighted image has assigned a value that positively correlates with the chrominance of a corresponding pixel in the luminance image and/or that positively correlate with the darkness of a corresponding pixel in the luminance image.

Generally, colored pixels (whose color information is contained in the chrominance image) and darker pixels (luminance image) are more likely to be tissue than glass; hence, pixels with a high chrominance (color) component and/or darker pixels (according to luminance) are weighted higher.

The computation of the chrominance UV and luminance L image are performed by the image analysis system as already described for embodiments of the invention.

According to embodiments, the image analysis system comprises a graphical user interface configured for displaying a selectable GUI element. The GUI element enables a user to select one of the slide-type specific or the generic tissue detection routines. The slide-type specific tissue detection routine is one of a TMA-slide-routine, a control-slide-routine, cell-line-slide-routine, and a smear-slide-routine. In addition or alternatively, the image analysis system displays the detected tissue regions, wherein the color and/or brightness of the pixels of the displayed tissue regions depend on the weights [soft-weights] assigned to each of the tissue region pixels. In addition or alternatively, the GUI enables a user to add extra focus points on regions of the displayed (soft-weighted) tissue regions, the adding of the extra focus points triggering a scanner to scan regions indicated by the focus points in more detail.

In a further aspect, the invention relates to an image analysis method for detecting a tissue region in a digital image of a tissue slide. A tissue sample is mounted on the slide. The method is implemented in an image analysis system comprising a processor and a storage medium. The method comprises:

selecting one of the slide-type specific tissue detection routines;

checking, before and/or while the selected slide-type specific tissue detection routine is performed, if the selected slide-type specific tissue detection routine corresponds to the tissue slide type of the slide depicted in the digital image;

if yes, automatically performing the selected slide-type specific tissue detection routine for detecting the tissue region in the digital image if no, automatically performing the generic tissue detection routine for detecting the tissue region in the digital image.

In a further aspect, the invention relates to a storage medium comprising instructions interpretable by a processor of an image analysis system, the instructions when executed by the processor cause the image analysis system to perform the method according to an image processing method implemented in an image analysis system according to any one of the embodiments described herein.

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. Examples of input devices include a keyboard, a cursor control devices (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework.

Those of ordinary skill in the related art will appreciate that interfaces may include one or more GUI's, CLI's or a combination thereof. A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

System memory may include any of a variety of known or future memory storage devices that can be used to store the desired information and that can be accessed by a computer. Computer readable storage media may include volatile and non-volatile, removable and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

Additional Embodiments

1. An image analysis system (220) configured for detecting a tissue region in a digital image of a tissue slide, wherein a tissue sample is mounted on the tissue slide, the image analysis system comprising a processor (220) and a storage medium, the storage medium comprising a plurality of slide-type specific tissue detection routines (213, 214, 215, 216) and a generic tissue detection routine (217), the image analysis system being configured for performing a method comprising: selecting one of the slide-type specific tissue detection routines; checking, before and/or while the selected slide-type specific tissue detection routine is performed, if the selected slide-type specific tissue detection routine corresponds to the tissue slide type of the slide depicted in the digital image; if yes, automatically performing the selected slide-type specific tissue detection routine for detecting the tissue region in the digital image if no, automatically performing the generic tissue detection routine for detecting the tissue region in the digital image.

2. The image analysis system of embodiment 1, wherein the digital image is a thumbnail image.

3. The image analysis system of any one of the previous embodiments, wherein the image analysis system comprises a user interface, wherein the selection of the slide-type specific tissue detection routine comprises receiving a user's selection of a tissue slide type via the user interface; and selecting the one of the slide-type specific tissue detection routines assigned the tissue slide type selected by the user.

4. The image analysis system of any one of the previous embodiments, wherein the generic tissue detection routine and one or more of the slide-type specific tissue detection routines comprise a sub-routine for generating a binary mask (M) that selectively masks non-tissue regions, the sub-routine comprising: computing a histogram (800) of a grayscale version of the digital image; extracting a plurality of intensity thresholds (rts) from the histogram; applying the plurality of intensity thresholds on the digital image for generating a plurality of intermediate masks from the digital image; generating the binary mask (M) by combining all the intermediate masks.

5. The image analysis system of embodiment 4, the extraction of the plurality of intensity thresholds from the histogram comprising: identifying a max-grayscale-index (mgs), the max-grayscale-index being the maximum grayscale intensity value observed in the histogram; identifying a max-histogram-location (mhl), the max-histogram-location being the grayscale intensity value having the highest occurrence frequency in the histogram; computing a right-gap by subtracting the maximum-histogram-location (mhl) from the max-grayscale-index (mgs); computing a glass-left-cutoff according to glass-left-cutoff=max-histogram-location(mhl)-rightgap; performing the extraction of the plurality of thresholds such that the lowest one (dco[0]) of the thresholds is an intensity value equal to or larger than glass_left_cutoff−rightgap and such that the highest one of the thresholds is equal to or smaller than glass_left_cutoff+ rightgap.

6. The image analysis system of embodiment 5, the extraction of the plurality of intensity thresholds from the histogram comprising: computing an interval-range-gap(irg) according to irg=max(1, round(rightgap/constant)), wherein constant is a predefined numerical value between 2 and 20, preferentially between 3 and 8; computing a max_rightgap value according to max_rightgap=min(rightgap−1, round (rightgap*gap_cutoff_fraction), wherein the gap_cutoff_ fraction is a predefined value in the range of 0.5-0.95, preferentially 0.7-0.8; computing a number_interval_terms according to number_interval_terms=((max_rightgap+ rightgap)/interval_range_gap); creating the plurality of threshold such that their number is identical to the computed number_interval_terms.

7. The image analysis system of embodiments 4, 5 or 6, the application of the plurality of intensity thresholds (rts) on the digital image for generating a plurality of intermediate masks comprising: a) creating a first intermediate mask by masking all pixels in the digital image whose grayscale value is below a first one of the plurality of thresholds; b) creating a second intermediate mask by masking all pixels in the digital image whose grayscale value is below a second one of the plurality of thresholds; c) performing a connected-component-analysis on the unmasked pixels of the first mask for identifying first blobs; d) performing a connected-component-analysis on the unmasked pixels of the second mask for identifying second blobs; e) merging the first and second mask into a merged mask, the merging comprising: masking all first blobs whose size is below an absolute-minimum-area and masking all first blobs whose size is above the absolute-minimum-area but below a conditional-minimum-area and which lack a first blob in a predefined neighborhood area around said first blob; after having performed the masking of one or more of the first blobs, unifying the unmasked regions of the first and second mask to generate the unmasked regions of the merged mask, all other regions of the merged mask being masked regions; f) using the merged mask as a new first intermediate mask, selecting a third one of the threshold for computing a new second intermediate mask from the third threshold, repeating steps c)-e) until each of the plurality of thresholds was selected, and outputting the finally generated merged mask as the merged binary mask (M).

8. The image analysis system of embodiment 7, the absolute-minimum-area being in the range of 100%-200% of an expected size of a blob representing a tissue cell, the conditional-minimum-area being in the range of 30%-70% of an expected size of a blob representing a tissue cell.

9. The image analysis system of any one of the previous embodiments, wherein the slide-type specific tissue detection routines comprise a TMA-slide-routine, a TMA-slide routine being configured for detecting the tissue region in a tissue micro array (TMA) slide, the TMA-slide routine being configured for: generating a binary mask (M) by performing the sub-routine of any one of embodiments 4-8; applying the binary mask (M) on the digital image and selectively analyzing unmasked regions in the digital image for detecting a grid of tissue regions.

10. The image analysis system of embodiment 9, wherein the selected slide-type specific tissue detection routine is a TMA-slide routine and the image analysis system is further configured for: if the grid of tissue regions is not detected in the unmasked regions of the digital image, determining that the selected TMA-slide tissue detection routine does not correspond to the tissue slide type of the tissue slide depicted in the digital image; and terminating execution of the TMA-slide tissue detection routine and starting execution of the generic tissue detection routine.

11. The image analysis system of any one of the previous embodiments 1-8, wherein the slide-type specific tissue detection routines comprise a control-slide-routine, a control-slide routine being configured for detecting the tissue region in a control slide, the control-slide routine being configured for: generating a binary mask (M) by performing the sub-routine of any one of embodiments 4-8; applying the binary mask (M) on the digital image; and selectively analyzing unmasked regions in the digital image for detecting a number of tissue regions positioned in a straight line.

12. The image analysis system of embodiment 11, wherein the selected slide-type specific tissue detection routine is a control-slide routine and the image analysis system is further configured for: if the number of tissue regions in a straight line are not detected in the unmasked regions of the digital image, determining that the selected control-slide tissue detection routine does not correspond to the tissue slide type of the tissue slide depicted in the digital image; and terminating execution of the control-slide tissue detection routine and starting execution of the generic tissue detection routine.

13. The image analysis system of any one of the previous embodiments 1-8, wherein the slide-type specific tissue detection routines comprise a cell-line-slide-routine, a cell-line-slide-routine being configured for detecting the tissue region in a cell-line-slide, a cell-line-slide being a tissue slide comprising a single, disc-shape tissue sample, the cell-line-slide routine being configured for: computing a grayscale image as a derivative of the digital image; computing a gradient magnitude image as a derivative of the grayscale image; computing a histogram (800) of the digital image; extracting a plurality of intensity thresholds (rts) from the histogram; applying a plurality of intensity threshold values on the digital image for generating a plurality of intermediate masks from the digital image; generating a binary mask (M) by combining all the intermediate masks; applying the binary mask (M) on the digital image and the gradient magnitude image; and performing radial symmetry based voting selectively on the unmasked region in the gradient magnitude image for detecting a center and a radius of a single tissue region.

14. The image analysis system of embodiment 13, wherein the selected slide-type specific tissue detection routine is a cell-line-slide routine and the image analysis system is further configured for: if the single tissue region was not detected or if the detected radius or the detected location of the center deviates from a radius or center location expected for the cell-line-slide type, determining that the selected cell-line-slide tissue detection routine does not correspond to the tissue slide type of the tissue slide depicted in the digital image; and terminating execution of the cell-line-slide tissue detection routine and starting execution of the generic tissue detection routine.

15. The image analysis system of any one of the previous embodiments 1-8, wherein the slide-type specific tissue detection routines comprise a smear-slide-routine, a smear-slide routine being configured for detecting the tissue region in a smear slide, a smear slide being a slide type where on which the tissue region is diffused throughout the slide, the smear-slide routine being configured for: computing a luminance image as a derivative of the digital image, the luminance image being an L-channel image of a LUV color space representation of the digital image; computing a chrominance image as a derivative from the digital image, the chrominance image being a derivative of the U,V-channels of the LUV color space representation of the digital image; performing hysteresis thresholding on an inverted version of the luminance image for generating a luminance-based mask; performing hysteresis thresholding on an inverted version of the chrominance image for generating a chrominance-based mask; combining the luminance-based mask and the chrominance-based mask to obtain a binary mask (M); applying the binary mask on the digital image; and selectively analyzing unmasked regions in the digital image for detecting the diffused tissue region.

16. The image analysis system of embodiment 15, wherein performing the hysteresis thresholding comprises: determining, for each set of adjacent pixels whose pixel value meets a lower and an upper threshold applied during the hysteresis thresholding, if the set of pixels covers at least an empirically determined area; if yes, generating the binary mask such that said set of pixels is unmasked; if no, generating the binary mask such that said set of pixels is masked.

17. The image analysis system of any one of the previous embodiments, wherein the tissue slide is a glass slide and the tissue detection routines are configured for generating masks that selectively mask glass regions, wherein tissue regions are unmasked regions in said masks.

18. The image analysis system according to any one of the previous embodiments 4-17, further comprising using size and distance constraints to detect and discard smaller regions from intermediate masks when combining the intermediate masks to generate the binary mask.

19. The image analysis system according to any one of the previous embodiments, the generic and one or more of the tissue-slide-type-specific tissue detection routines being further configured for: generating a weighted image from the digital image, each pixel in the weighted image having assigned a weight in a value range comprising more than two different values, the weight indicating a likelihood that said pixel belongs to a tissue region as compared to belonging to glass.

20. The image analysis system of embodiment 19, the generation of the weighted image comprising: computing a luminance image as a derivative of the digital image, the luminance image being an L-channel image of a LUV color space representation of the digital image, or accessing a luminance image having been computed already for generating a binary mask (M); computing a chrominance image as a derivative from the digital image, the chrominance image being a derivative of the U,V-channels of the LUV color space representation of the digital image, or accessing a chrominance image having been computed already for generating the binary mask (M); masking the luminance and/or the chrominance with a binary mask (M), the binary mask selectively masking non-tissue regions; generating a weighted image (SW) as a derivative of the luminance and/or the chrominance image, wherein each pixel in the weighted image has assigned a value that positively correlates with the chrominance of a corresponding pixel in the luminance image and/or that positively correlates with the darkness of a corresponding pixel in the luminance image.

21. The image analysis system according to any one of the previous embodiments, the image analysis system comprising a graphical user interface configured for: displaying a selectable GUI element (219), the GUI element enabling a user to select one of the slide-type specific or the generic tissue detection routines; and/or displaying the detected tissue regions, wherein the color and/or brightness of the pixels of the displayed tissue regions depend on the weights assigned to each of the tissue region pixels; and/or enabling a user to add extra focus points on regions of the displayed tissue regions, the adding of the extra focus points triggering a scanner to scan regions indicated by the focus points in more detail.

22. An image analysis method for detecting a tissue region in a digital image of a tissue slide, wherein a tissue sample is mounted on the tissue slide, the method being implemented in an image analysis system comprising a processor and a storage medium, the method comprising: selecting one of the slide-type specific tissue detection routines; checking, before and/or while the selected slide-type specific tissue detection routine is performed, if the selected slide-type specific tissue detection routine corresponds to the tissue slide type of the slide depicted in the digital image; if yes, automatically performing the selected slide-type specific tissue detection routine for detecting the tissue region in the digital image if no, automatically performing the generic tissue detection routine for detecting the tissue region in the digital image.

23. A storage medium comprising instructions interpretable by a processor (220) of an image analysis system, the instructions when executed by the processor cause the image analysis system to perform the method according to embodiment 22.

24. A system for detecting an area-of-interest (AOI) on a thumbnail image of a tissue slide, the system comprising: a processor (220); and a memory coupled to the processor, the memory to store computer-readable instructions that, when executed by the processor, cause the processor to perform operations comprising: receiving a thumbnail image from a camera coupled to the processor; receiving, via a user interface, a selection of a thumbnail image type; and determining an area of interest (AOI) from the thumbnail image using one of a plurality of AOI detection methods corresponding to the thumbnail image type.

25. The system of embodiment 24, wherein the thumbnail image type is selected from among a plurality of thumbnail image type choices provided on the user interface.

26. The system of embodiment 24, wherein the operations further comprise determining that the thumbnail image type is incorrectly input, and using another one of the plurality of AOI detection methods.

27. The system of embodiment 26, wherein the thumbnail image type is of a tissue micro array (TMA) slide, and wherein the operations further comprise attempting to detect a grid of cores based on a binary mask generated using a range of threshold values computed from an image histogram of the thumbnail image.

28. The system of embodiment 27, wherein if the grid of cores is not detected in the thumbnail image, then the input is determined to be incorrect and a generic method for AOI detection is used.

29. The system of embodiment 26, wherein the thumbnail image type is of a control slide, and wherein the operations further comprise attempting to detect a number of cores positioned in a straight line in the thumbnail image.

30. The system of embodiment 29, wherein if the number of cores in a straight line are not detected, then the input is determined to be incorrect and a generic method for AOI detection is used.

31. The system of embodiment 24, wherein the thumbnail image type is of a ThinPrep® slide or equivalent, and wherein the operations further comprise detecting the center and radius of the single tissue core while performing radial symmetry based voting on a gradient magnitude of a downsampled version of an enhanced grayscale version of the thumbnail image.

32. The system of embodiment 24, wherein the thumbnail image type is that of a smear slide, and wherein the operations further comprise determining lower and upper thresholds for a luminance and a chrominance image derived from the thumbnail image, and then performing hysteresis thresholding on the luminance and chrominance images of the thumbnail image to obtain a final effective binary mask.

33. The system of embodiment 32, wherein the hysteresis thresholding is performed based on an assumption that a smear tissue sample is spread all over the slide, and based on an empirically determined area constraint.

34. The system of embodiment 24, wherein the thumbnail image type is that of a generic slide, and wherein the operations further comprise obtaining an initial estimate of the tissue region as compared to glass, by using a range of thresholds computed based on a histogram of the thumbnail image.

35. The system of embodiment 34, wherein, to obtain a more precise AOI region, the operations further comprise using size and distance constraints to detect and discard smaller regions from the AOI.

36. The system of embodiment 24, wherein the operations further comprise generating a soft-weighted image depicting the AOI tissue probability image.

37. The system of embodiment 35, wherein weights are assigned to pixels in the soft-weighted image based on a likelihood that they represent a tissue region as compared to belonging to glass.

38. The system of embodiment 36, wherein the generating of the soft-weighted image uses the thumbnail image as well as a binary mask as an input, wherein the soft-weighted image is zero valued at all pixels except the pixels which are non-zero inside the binary mask, and these non-zero pixels get assigned higher or lower values depending on whether they are more or less likely to belong to tissue as compared to belonging to glass.

39. The system of embodiment 37, wherein the binary mask is generated by said one or another of the plurality of AOI detection methods.

40. The system of embodiment 35, wherein the operations further comprise displaying the soft-weighted AOI image on a display.

41. The system of embodiment 39, wherein the operations further comprise providing a user interface enabling a user to add extra focus points on indicated regions of the displayed soft-weighted AOI image, the extra focus points enabling a scanner to scan the indicated regions in more detail.

42. A system for detecting an area-of-interest (AOI) on a thumbnail image of a tissue slide, comprising: a processor; and a memory coupled to the processor, the memory to store computer-readable instructions that, when executed by the processor, cause the processor to perform operations comprising: determining an area of interest (AOI) from a thumbnail image using one of a plurality of AOI detection methods depending on the thumbnail image type; and outputting a soft-weighted image depicting the detected AOI; wherein the thumbnail image type is input by a user via a user interface and represents one of a ThinPrep® slide, a tissue microarray slide, a control slide, a smear slide, or a generic slide.

43. A system for detecting an area-of-interest (AOI) on a thumbnail image of a tissue slide, comprising: a processor; and a memory coupled to the processor, the memory to store computer-readable instructions that, when executed by the processor, cause the processor to perform operations comprising: receiving an input comprising a thumbnail image and a thumbnail image type; determining an area of interest (AOI) from the thumbnail image using one of a plurality of AOI detection methods depending on the thumbnail image type, the plurality of AOI detection methods including a ThinPrep® method, a tissue microarray method, a control method, a smear method, or a generic method; and upon determining that the thumbnail image type is incorrectly input, using the generic method The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A system for detecting an area-of-interest (AOI) on a thumbnail image of a tissue slide, the system comprising:
a processor; and
a memory coupled to the processor, the memory to store computer-readable instructions that, when executed by the processor, cause the processor to perform operations comprising:
receiving a thumbnail image from a camera coupled to the processor;
displaying, on a user interface, a plurality of thumbnail image types, wherein the plurality thumbnail image types are selected from the group consisting of a ThinPrep® slide, a tissue microarray slide, a control slide, a smear slide, and a generic slide;
receiving, via the user interface, a selection of one thumbnail image type from the plurality of displayed thumbnail image types;
determining the area of interest (AOI) within the received thumbnail image using one of a plurality of AOI detection methods corresponding to the selected thumbnail image type;
determining that the selected thumbnail image type is incorrectly input; and
using another one of the plurality of AOI detection methods.

2. The system of claim 1, wherein the selected thumbnail image type is of a tissue micro array (TMA) slide, and wherein the operations further comprise attempting to detect a grid of cores based on a binary mask generated using a range of threshold values computed from an image histogram of the thumbnail image, and wherein if the grid of cores is not detected in the thumbnail image, then the input is determined to be incorrect and a generic method for AOI detection is used.

3. The system of claim 1, wherein the selected thumbnail image type is of a control slide, and wherein the operations further comprise attempting to detect a number of cores positioned in a straight line in the thumbnail image, and wherein if the number of cores in a straight line are not detected, then the input is determined to be incorrect and a generic method for AOI detection is used.

4. The system of claim 1, wherein the selected thumbnail image type is of a ThinPrep® slide or equivalent, and wherein the operations further comprise detecting the center and radius of the single tissue core while performing radial symmetry based voting on a gradient magnitude of a down-sampled version of an enhanced grayscale version of the thumbnail image.

5. The system of claim 1, wherein the selected thumbnail image type is that of a smear slide, and wherein the operations further comprise determining lower and upper thresholds for a luminance and a chrominance image derived from the thumbnail image, and then performing hysteresis thresholding on the luminance and chrominance images of the thumbnail image to obtain a final effective binary mask, and wherein the hysteresis thresholding is performed based on an assumption that a smear tissue sample is spread all over the slide, and based on an empirically determined area constraint.

6. The system of claim 1, wherein the selected thumbnail image type is that of a generic slide, and wherein the operations further comprise obtaining an initial estimate of the tissue region as compared to glass by using a range of thresholds computed based on a histogram of the thumbnail image.

7. The system of claim 1, wherein the operations further comprise generating a soft-weighted image depicting the AOI tissue probability image, and wherein weights are assigned to pixels in the soft-weighted image based on a likelihood that they represent a tissue region as compared to belonging to glass, and wherein the generating of the soft-weighted image uses the thumbnail image as well as a binary mask as an input, wherein the soft-weighted image is zero valued at all pixels except the pixels which are non-zero inside the binary mask, and wherein these non-zero pixels are assigned higher or lower values depending on whether they are more or less likely to belong to tissue as compared to belonging to glass.

\* \* \* \* \*